US012402765B2

(12) United States Patent
Li et al.

(10) Patent No.: US 12,402,765 B2
(45) Date of Patent: Sep. 2, 2025

(54) FAN ASSEMBLY AND VACUUM CLEANER HAVING SAME

(71) Applicants: JIANGSU MIDEA CLEANING APPLIANCES CO., LTD., Suzhou (CN); MIDEA GROUP CO., LTD., Guangdong (CN)

(72) Inventors: Jinxiao Li, Suzhou (CN); Yuqiang Ma, Suzhou (CN); Wenhu Pan, Suzhou (CN); Dekang Wan, Suzhou (CN); Hang Zhao, Suzhou (CN); Meiquan Wu, Suzhou (CN); Mingqiang Gong, Suzhou (CN); Aibing Sun, Suzhou (CN); Fuping Cheng, Suzhou (CN)

(73) Assignees: JIANGSU MIDEA CLEANING APPLIANCES CO., LTD., Jiangsu (CN); MIDEA GROUP CO., LTD., Guangdong (CN)

( * ) Notice: Subject to any disclaimer, the term of this patent is extended or adjusted under 35 U.S.C. 154(b) by 0 days.

(21) Appl. No.: 18/070,963

(22) Filed: Nov. 29, 2022

(65) Prior Publication Data

US 2023/0165416 A1 Jun. 1, 2023

Related U.S. Application Data

(63) Continuation of application No. PCT/CN2021/134512, filed on Nov. 30, 2021.

(51) Int. Cl.

*A47L 5/22* (2006.01)
*F04D 17/16* (2006.01)
(Continued)

(52) U.S. Cl.

CPC .............. *A47L 5/22* (2013.01); *F04D 17/164* (2013.01); *F04D 29/002* (2013.01);
(Continued)

(58) Field of Classification Search

CPC ....... A47L 5/22; F04D 17/164; F04D 29/002; F04D 29/046; F04D 29/281; F04D 29/44;
(Continued)

(56) References Cited

U.S. PATENT DOCUMENTS

| | | |
|---|---|---|
| 4,097,186 A | 6/1978 | Budris |
| 8,267,644 B2 | 9/2012 | Nishida et al. |

(Continued)

FOREIGN PATENT DOCUMENTS

| | | |
|---|---|---|
| CN | 101449064 A | 6/2009 |
| CN | 102562657 A | 7/2012 |

(Continued)

OTHER PUBLICATIONS

Supplementary European Search Report dated Aug. 8, 2023 received in European Patent Application No. EP 21942133.6.

(Continued)

*Primary Examiner* — Woody A Lee, Jr.
*Assistant Examiner* — Eric A Lange
(74) *Attorney, Agent, or Firm* — Scully, Scott, Murphy & Presser, P.C.

(57) ABSTRACT

Provided are a fan assembly and a vacuum cleaner having same. The fan assembly includes a housing, an impeller assembly, and a driving member. At least part of the impeller assembly is accommodated in the housing. The impeller assembly includes a plurality of impellers connected in series in an airflow flowing direction of the fan assembly. The driving member is configured to drive the plurality of impellers to rotate.

20 Claims, 10 Drawing Sheets

(51) Int. Cl.

| | |
|---|---|
| ***F04D 29/00*** | (2006.01) |
| ***F04D 29/046*** | (2006.01) |
| ***F04D 29/28*** | (2006.01) |
| ***F04D 29/44*** | (2006.01) |

(52) U.S. Cl.
CPC ......... *F04D 29/046* (2013.01); *F04D 29/281* (2013.01); *F04D 29/44* (2013.01); *F04D 29/444* (2013.01); *F05D 2240/50* (2013.01)

(58) Field of Classification Search
CPC .... F04D 29/444; F04D 17/122; F04D 29/057; F04D 29/4253; F04D 25/0606; F05D 2240/50
See application file for complete search history.

(56) References Cited

U.S. PATENT DOCUMENTS

| | | | | |
|---|---|---|---|---|
| 2006/0182628 | A1 | 8/2006 | Kim et al. | |
| 2009/0246013 | A1 * | 10/2009 | Kenyon | F04D 25/08 415/206 |
| 2016/0290359 | A1 | 10/2016 | Lee et al. | |
| 2017/0311766 | A1 | 11/2017 | Hayamitsu | |
| 2018/0245598 | A1 | 8/2018 | Meier et al. | |
| 2018/0351431 | A1 | 12/2018 | Kim et al. | |

FOREIGN PATENT DOCUMENTS

| | | | | |
|---|---|---|---|---|
| CN | 202597137 | U | 12/2012 | |
| CN | 203756560 | U | 8/2014 | |
| CN | 204851785 | U | 12/2015 | |
| CN | 206221315 | U | 6/2017 | |
| CN | 106958538 | A | 7/2017 | |
| CN | 207315689 | U | 5/2018 | |
| CN | 108736648 | A | 11/2018 | |
| CN | 211355203 | U | 8/2020 | |
| CN | 111894872 | A | 11/2020 | |
| CN | 112253499 | A | 1/2021 | |
| CN | 112610512 | A | 4/2021 | |
| CN | 216278600 | U | 4/2022 | |
| DE | 1808122 | A1 * | 11/1968 | |
| EP | 2325493 | A2 | 5/2011 | |
| EP | 2740942 | A2 * | 6/2014 | A61C 17/04 |
| EP | 2325493 | A3 | 8/2014 | |
| EP | 3835589 | A1 | 6/2021 | |
| JP | 2016125437 | A | 7/2016 | |
| JP | 3233286 | U | 8/2021 | |
| KR | 10-2006-0026343 | A | 3/2006 | |
| KR | 10-2006-0075944 | A | 7/2006 | |
| KR | 102126885 | B1 | 7/2020 | |
| WO | 2016047256 | A1 | 3/2016 | |

OTHER PUBLICATIONS

Notice of Reasons for Refusal dated Feb. 6, 2024 received in Japanese Patent Application No. JP 2022-573468.
International Search Report dated Jun. 23, 2022 received in International Application No. PCT/CN2021/134512.
Japanese Notice of Reasons for Rejection dated Jul. 30, 2024 received in Japanese Patent Application No. 2022-573468, together with an English-language translation.
Non-Final Office Action dated Jul. 19, 2024 received in U.S. Appl. No. 18/072,041.
Non-Final Office Action dated Jul. 11, 2024 received in U.S. Appl. No. 18/071,906.
Office Action dated Dec. 18, 2024 received in U.S. Appl. No. 18/072,041.
Office Action dated Dec. 3, 2024 received in U.S. Appl. No. 18/071,906.
Decision to Grant a Patent dated Dec. 27, 2024 received in Japanese patent Application No. 2022-573468.
Office Action dated Apr. 11, 2025 received in U.S. Appl. No. 18/072,041.
First Office Action dated May 10, 2025 received in Chinese Patent Application No. 202111442612.2.

* cited by examiner

FAN ASSEMBLY AND VACUUM CLEANER HAVING SAME

CROSS-REFERENCE TO RELATED APPLICATION

The present application is a continuation application of PCT International Patent Application No. PCT/CN2021/134512, filed on Nov. 30, 2021, the entire contents of which are incorporated herein by reference for all purposes. No new matter has been introduced.

FIELD

The present disclosure relates to the field of vacuum cleaner technologies, and more particularly, to a fan assembly and a vacuum cleaner having the same.

BACKGROUND

With the improvement of people's living standard, a vacuum cleaner gradually enters innumerable homes to become an important cleaning appliance in daily life. Suction force of the vacuum cleaner directly affects cleaning effects. In the related art, an aerodynamic layout of a fan assembly of the vacuum cleaner still has a certain limitation, which causes the suction force of the vacuum cleaner to be limited. Besides, the fan assembly has a larger size and occupies a larger space.

SUMMARY

The present disclosure provides a fan assembly having advantages of low airflow loss and good aerodynamic performance.

The present disclosure further provides a vacuum cleaner having the fan assembly.

According to an embodiment of the present disclosure, the fan assembly includes: a housing, an impeller assembly, and a driving member. At least part of the impeller assembly is accommodated in the housing, and the impeller assembly includes a plurality of impellers connected in series in an airflow flowing direction of the fan assembly. The driving member is configured to drive the plurality of impellers to rotate.

The fan assembly according to the embodiment of the present disclosure has reduced gas flow loss and improved aerodynamic performance.

According to some embodiments of the present disclosure, the fan assembly further includes: a first flow guide member. The first flow guide member and an inner surface of the housing define a flow guide channel; the flow guide channel is adapted to guide and discharge output air of an impeller on an upstream side to an impeller on a downstream side; and the first flow guide member has a cross-sectional area decreasing in a direction from the impeller on the upstream side towards the impeller on the downstream side.

According to some embodiments of the present disclosure, a maximum diameter a of the first flow guide member and a diameter b of the impeller on the upstream side satisfy: $1.05 \leq a/b \leq 1.2$.

According to some embodiments of the present disclosure, each of the plurality of impellers has an impeller inlet extending in an axial direction of the fan assembly and an impeller outlet located on an outer peripheral wall of the impeller. The first flow guide member is adapted to guide output air of an impeller outlet on an upstream side to flow to an impeller inlet on a downstream side at least in the axial direction of the fan assembly; and a sectional area of an impeller outlet of an impeller located upstream is greater than a sectional area of an impeller outlet of an impeller located downstream.

According to some embodiments of the present disclosure, the first flow guide member includes a first flow guide member body, and a plurality of flow guide ribs arranged at intervals along an outer peripheral wall of the first flow guide member body. An end, away from the first flow guide member body, of each of the plurality of flow guide ribs abuts against an inner wall surface of the housing to define the flow guide channel between two adjacent flow guide ribs, the first flow guide member body, and a cavity wall of an accommodation cavity of the housing.

According to some embodiments of the present disclosure, the flow guide rib extends in an arc shape. A deflection angle of the flow guide rib relative to an axial direction of the fan assembly decreases in the direction from the impeller on the upstream side towards the impeller on the downstream side. An end of the flow guide rib away from the impeller on the upstream side extends in the axial direction of the fan assembly.

According to some embodiments of the present disclosure, the plurality of flow guide ribs includes a first flow guide rib and a second flow guide rib. A length over which the first flow guide rib extends is greater than a length over which the second flow guide rib extends; the length f of the second flow guide rib and the length g of the first flow guide rib satisfy: $0.3 \leq f/g \leq 0.7$; and the first flow guide rib and the second flow guide rib are alternately arranged at intervals along the outer peripheral wall of the first flow guide member body.

According to some embodiments of the present disclosure, an end of the first flow guide rib adjacent to the impeller on the upstream side and an end of the second flow guide rib adjacent to the impeller on the upstream side are located in a same plane.

According to some embodiments of the present disclosure, a flow guide inlet and a flow guide outlet are formed at two ends of the flow guide channel, respectively. The flow guide channel includes a first flow guide segment and a second flow guide segment that are connected successively in a direction from the flow guide inlet to the flow guide outlet. In the direction from the flow guide inlet to the flow guide outlet, a sectional area of the first flow guide segment gradually decreases, a sectional area of the second flow guide segment gradually increases, and a sectional area of the flow guide outlet is greater than a sectional area of the flow guide inlet.

According to some embodiments of the present disclosure, the flow guide rib has a first extending segment adjacent to the impeller on the upstream side, a second extending segment adjacent to the impeller on the downstream side, and a connection segment connecting the first extending segment and the second extending segment. The first extending segment and the second extending segment each has a thickness decreasing in a direction away from the connection segment.

According to some embodiments of the present disclosure, the first flow guide member has an outer limiting protrusion disposed thereon. The cavity wall of the accommodation cavity of the housing has a rotation-limiting groove matching the outer limiting protrusion. The outer limiting protrusion is located in the rotation-limiting groove.

According to some embodiments of the present disclosure, the fan assembly further includes: a second flow guide member configured in an annular shape. The second flow guide member is disposed between the first flow guide member and the impeller located on the upstream side of the first flow guide member, and sleeved on an outer side of the impeller on the upstream side to guide output air of an upstream impeller outlet to the flow guide channel.

According to some embodiments of the present disclosure, the second flow guide member is radially spaced from the impeller on the upstream side to form an annular micro gap therebetween.

According to some embodiments of the present disclosure, the first flow guide member has a mounting surface, and the mounting surface is a surface of the first flow guide member close to the impeller on the upstream side. The second flow guide member includes a second flow guide member body and a mounting portion disposed on the second flow guide member body. A mounting portion of the first flow guide member is formed on the mounting surface as a first mounting groove. The mounting portion of the second flow guide member is formed as a second mounting protrusion, and detachably connected to the mounting portion of the first flow guide member.

According to some embodiments of the present disclosure, the second flow guide member includes a second flow guide member body. The second flow guide member body has a flow guide surface and a pressing-abutting surface. The pressing-abutting surface of the second flow guide member body matches and presses and abuts against the mounting surface, and the flow guide surface of the second flow guide member body is configured to guide the output air of the impeller outlet to the flow guide channel.

According to some embodiments of the present disclosure, an impeller outlet of the impeller on the upstream side has a lower edge. An inner circumferential edge of the flow guide surface of the second flow guide member body extends to a position adjoining the lower edge of the impeller outlet; an outer circumferential edge of the flow guide surface of the second flow guide member body extends to a junction between the mounting surface of the first flow guide member and an outer peripheral surface of the first flow guide member; and the flow guide surface of the second flow guide member body smoothly transitions to the outer peripheral surface of the first flow guide member.

According to some embodiments of the present disclosure, an upstream flow guide surface corresponding to the impeller on the upstream side is formed on an inner peripheral surface of the housing. The upstream flow guide surface corresponds to the flow guide surface of the second flow guide member body. An upstream transition air channel is defined between the upstream flow guide surface and the flow guide surface of the second flow guide member body. The upstream transition air channel communicates the impeller outlet with an inlet of the flow guide channel, and a cross-sectional area of the upstream transition air channel decreases from the impeller outlet to the inlet of the flow guide channel.

According to some embodiments of the present disclosure, the plurality of impellers is coaxially arranged in the axial direction of the fan assembly; and the housing has an accommodation cavity inside and has an air inlet and an air outlet that are in communication with the accommodation cavity. The impeller on the upstream side is disposed adjacent to the air inlet, and the air inlet is in communication with an impeller inlet of the impeller on the upstream side. The impeller on the downstream side is disposed adjacent to the air outlet, and an impeller outlet of the impeller on the downstream side is in communication with the air outlet.

According to some embodiments of the present disclosure, a cavity wall of the accommodation cavity smoothly transitions to an inner peripheral wall of an impeller inlet of the impeller on the downstream side, and a minimum diameter c of the first flow guide member and an inner diameter d of the impeller inlet of the impeller on the downstream side satisfy: c=d.

According to some embodiments of the present disclosure, the fan assembly further includes: a diffuser disposed between the impeller on the downstream side and the air outlet. An air outlet channel is defined between the diffuser and the housing and in communication with the air outlet. The fan assembly further includes a third flow guide member configured in an annular ship. The third flow guide member is disposed between the impeller on the downstream side and the diffuser, and sleeved on an outer side of the impeller on the downstream side, to guide output air of the impeller outlet on the downstream side to the air outlet channel.

According to some embodiments of the present disclosure, the diffuser has a diffuser mounting surface, and the diffuser mounting surface is a surface of the diffuser close to the impeller on the downstream side. The third flow guide member includes a third flow guide member body and a mounting portion disposed on the third flow guide member body. A diffuser mounting portion is formed on the diffuser mounting surface as a diffuser mounting groove. The mounting portion of the third flow guide member is formed as a third mounting protrusion and detachably connected to the diffuser mounting portion.

According to some embodiments of the present disclosure, the third flow guide member includes a third flow guide member body, and the third flow guide member body has a flow guide surface and a pressing-abutting surface. The pressing-abutting surface of the third flow guide member body matches and presses and abuts against the diffuser mounting surface, and the flow guide surface of the third flow guide member body is configured to guide the output air of the impeller outlet on the downstream side to the air outlet channel.

According to some embodiments of the present disclosure, the impeller outlet of the impeller on the downstream side has a lower edge. An inner circumferential edge of the flow guide surface of the third flow guide member body extends to a position adjoining the lower edge of the impeller outlet. An outer circumferential edge of the flow guide surface of the third flow guide member body extends to a junction between the diffuser mounting surface and an outer peripheral surface of the diffuser.

According to some embodiments of the present disclosure, a downstream flow guide surface corresponding to the impeller on the downstream side is formed on an inner peripheral surface of the housing. The downstream flow guide surface corresponds to the flow guide surface of the third flow guide member body, and a downstream transition air channel is defined between the downstream flow guide surface and the flow guide surface of the third flow guide member body. The downstream transition air channel communicates the impeller outlet with an inlet of the air outlet channel, and a cross-sectional area of the downstream transition air channel decreases from the impeller outlet to the inlet of the air outlet channel.

According to some embodiments of the present disclosure, the plurality of impellers at least includes: a first-level impeller and a second-level impeller. The first-level impeller is disposed adjacent to the air inlet, the first flow guide member is disposed on a downstream side of the first-level impeller, the second-level impeller is disposed on a downstream side of the first flow guide member, and an impeller outlet of the second-level impeller is in communication with the air outlet. Each of the first-level impeller and the second-level impeller includes: an impeller cover, an impeller disk, and a plurality of vanes. The impeller cover has the impeller inlet opened in an axial direction of the impeller. The impeller disk faces and is spaced from the impeller cover in the axial direction of the impeller. An air channel in communication with the impeller inlet is defined between the impeller disk and the impeller cover, and the impeller outlet is formed in a radial outer end of the air channel. The plurality of vanes is arranged at intervals in the air channel in a circumferential direction of the impeller inlet. A number of vanes of the plurality of vanes is N, where $7\leqslant N\leqslant 13$. Any two adjacent vanes in the circumferential direction, the impeller cover, and the impeller disk define an impeller sub-outlet. A sectional area of an impeller sub-outlet of the first-level impeller is greater than a cross-sectional area of an impeller sub-outlet of the second-level impeller.

According to some embodiments of the present disclosure, the number of vanes of the first-level impeller is N1, the number of vanes of the second-level impeller is N2, and a number of flow guide ribs of the first flow guide member is N3, where $8\leqslant N1\leqslant 12$, $7\leqslant N2\leqslant 11$, and $N3>N1>N2$.

According to some embodiments of the present disclosure, an outer diameter of the first-level impeller is D11, where 37 mm$\leqslant$ D11$\leqslant$ 43 mm; and/or an outer diameter of the second-level impeller is D21, where 37 mm$\leqslant$ D21$\leqslant$ 43 mm.

According to some embodiments of the present disclosure, D11=D21.

According to some embodiments of the present disclosure, a spacing between the first-level impeller and the second-level impeller in the axial direction of the fan assembly is L1, and a spacing between the first flow guide member and the second-level impeller in the axial direction of the fan assembly is L2, where $1.27\leqslant D11/L1\leqslant 1.87$, $1.27\leqslant D21/L1\leqslant 1.87$, and $0.13\leqslant L2/L1\leqslant 0.26$.

According to some embodiments of the present disclosure, the number of flow guide ribs and the number of vanes of each of the first-level impeller and the second-level impeller are mutual prime numbers, and a ratio of a diameter of an inner wall of the housing at a position radially facing an impeller disk of each impeller to an outer diameter of the corresponding impeller disk is in a range of 1.25 to 1.43.

According to some embodiments of the present disclosure, an inner diameter of the first-level impeller is D12, where 18 mm$\leqslant$ D12$\leqslant$ 21 mm; and/or an inner diameter of the second-level impeller is D22, where 18 mm$\leqslant$ D21$\leqslant$ 21 mm.

According to some embodiments of the present disclosure, $D22\leqslant D12$.

According to some embodiments of the present disclosure, a width of a first-level impeller outlet of the first-level impeller is B11, and a width of a second-level impeller outlet of the second-level impeller is B21, where $B21=a1*B11$, and $0.6\leqslant a1\leqslant 0.9$.

According to some embodiments of the present disclosure, a spacing between the first-level impeller and the second-level impeller in the axial direction of the fan assembly is L1, where $0.14\leqslant B11/L1\leqslant 0.17$, and $0.14\leqslant B21/L1\leqslant 0.17$.

According to some embodiments of the present disclosure, an air channel inlet is formed in a radial inner end of the impeller air channel, a width of a first-level air channel inlet of the first-level impeller is B12, and a width of a second-level air channel inlet of the second-level impeller is B22, where $B22=c1*B12$, and $0.8\leqslant c1\leqslant 1$.

According to some embodiments of the present disclosure, the housing includes a housing body and a cover. The housing body is adapted to match the cover to define the accommodation cavity, the air inlet is formed on the cover, the housing body is detachably connected to the cover, the cover is sleeved on the first-level impeller, the cover defines an annular groove surrounding the air inlet and facing towards the first flow guide member, and an outer circumferential edge of an impeller inlet of the first-level impeller is located in the annular groove.

According to some embodiments of the present disclosure, the fan assembly further includes sealing members. The sealing members including a first sealing member and a second sealing member. The first sealing member is configured to seal a gap between the annular groove and the first-level impeller, and the second sealing member is configured to seal a gap between an outer circumferential edge of an impeller outlet of the second-level impeller and a cavity wall of the accommodation cavity.

According to some embodiments of the present disclosure, the fan assembly further includes: a bearing seat detachably disposed on the first flow guide member; and a first bearing having a bearing mounting groove for accommodating the first bearing. An output shaft of the driving member penetrates the first bearing.

According to some embodiments of the present disclosure, a limiting groove for accommodating the bearing seat is defined on an axial end surface of the first flow guide member facing towards the impeller on the upstream side, a through hole of the first flow guide member is defined in a bottom wall of the limiting groove, and the output shaft of the driving member penetrates through the through hole of the first flow guide member.

According to some embodiments of the present disclosure, the bearing seat includes: a main body portion; an outer ring portion surrounding an outer periphery of the main body portion and disposed coaxially with the main body portion; and a connection portion. The bearing mounting groove is defined on the main body portion, and a bottom wall of the bearing mounting groove has a bearing seat through hole directly facing the through hole of the first flow guide member. Two ends of the connection portion are connected to opposite side walls of the main body portion and the outer ring portion, respectively. The main body portion, the outer ring portion, and the connection portion are all embedded in the limiting groove.

According to some embodiments of the present disclosure, the limiting groove includes: a first limiting groove extending in an axial direction of the fan assembly; a second limiting groove extending in a circumferential direction of the fan assembly and formed in an annular shape; and a third limiting groove extending in a radial direction of the fan assembly. The main body portion is accommodated in the first limiting groove, and the through hole of the first flow guide member is defined in a bottom wall of the first limiting groove. The outer ring portion is accommodated in the second limiting groove. Two ends of the third limiting groove are in communication with the first limiting groove and the second limiting groove, respectively, and the connection portion is located in the third limiting groove.

According to some embodiments of the present disclosure, a support post is disposed on a side of the bearing seat away from the impeller on the upstream side, the support post extending away from the impeller on the upstream side in an axial direction of the fan assembly, and the limiting groove defines as a support post penetrating hole in which the support post is accommodated. The first flow guide member includes an outer limiting protrusion, the outer limiting protrusion is disposed on an outer peripheral wall of the first flow guide member and extends in an axial direction of the first flow guide member, and the support post penetrating hole penetrates the outer limiting protrusion and the first flow guide member body in the axial direction.

According to some embodiments of the present disclosure, the plurality of impellers is located on a same side of the driving member in an axial direction of the fan assembly.

According to some embodiments of the present disclosure, at least two impellers of the plurality of impellers are distributed on two sides of the driving member in an axial direction of the fan assembly.

According to some embodiments of the present disclosure, the housing has a contraction portion, an impeller on a downstream side is disposed on a downstream side of the contraction portion, an inner diameter of the contraction portion decreases in a direction from the driving member towards the impeller on the downstream side, and a minimum inner diameter e of the contraction portion and an inner diameter d of an impeller inlet of the impeller satisfy: e=d.

The vacuum cleaner according to an embodiment of the present disclosure includes the fan assembly described above.

The vacuum cleaner according to an embodiment of the present disclosure has reduced gas flow loss and improved aerodynamic performance of the fan assembly.

Additional aspects and advantages of the present disclosure will be set forth in part in the following description and in part become apparent from the following description, or may be learned by practice of the present disclosure.

BRIEF DESCRIPTION OF THE DRAWINGS

The above-mentioned and/or additional aspects and advantages of the present disclosure will become apparent and readily understood from the following description of embodiments in conjunction with the accompanying drawings, in which.

Figure 1:
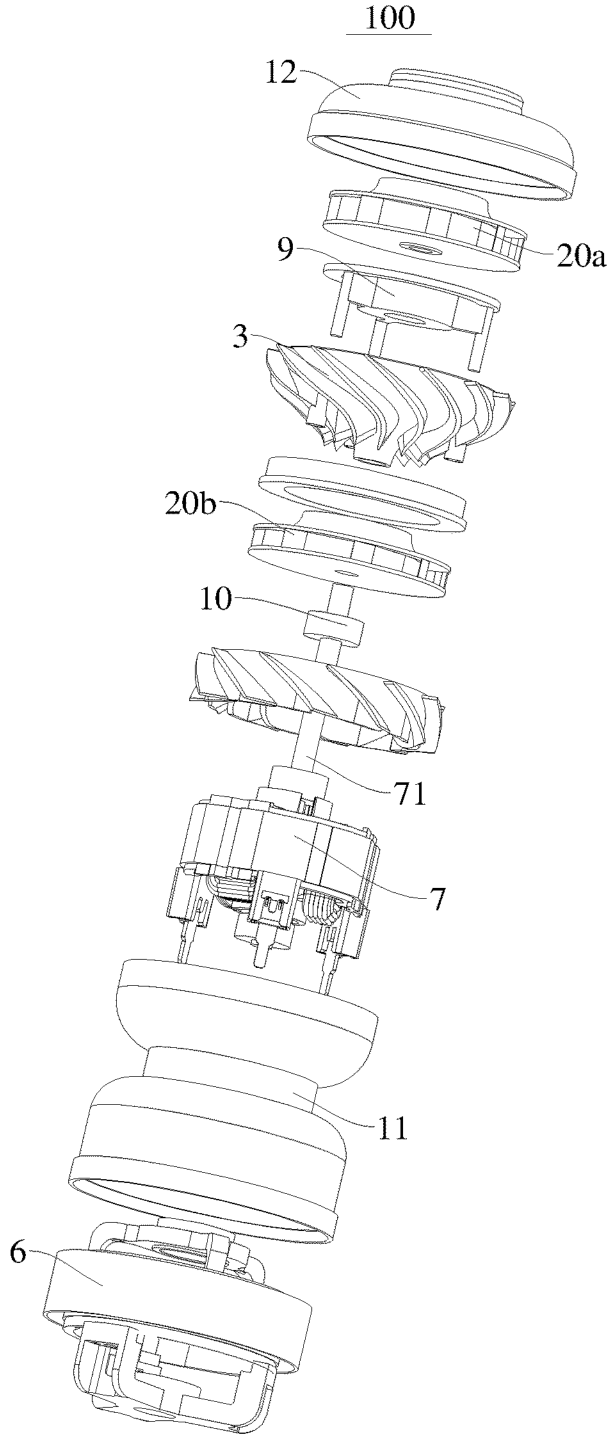
FIG. 1 is an exploded view of a fan assembly according to an embodiment of the present disclosure.

REFERENCE NUMERALS fan assembly 100;

housing 1; housing body 11; cover 12; accommodation cavity 13; air inlet 14; air outlet 15; rotation-limiting groove 16; contraction portion 17; annular groove 18;

impeller assembly 2; impeller 20; first-level impeller 20*a*; second-level impeller 20*b*; impeller inlet 201; impeller outlet 202; first-level impeller outlet 202*a*; second-level impeller outlet 202*b*; impeller air channel 203; air channel inlet 204; impeller sub-outlet 205; vane 21; impeller cover 22; impeller disk 23;

first flow guide member 3; flow guide channel 301; first flow guide member body 302; flow guide rib 303; first extending segment 306; second extending segment 307; connection segment 308; outer limiting protrusion 309; through hole 310 of the first flow guide member; support post penetrating hole 311; limiting groove 312; first limiting groove 313; second limiting groove 314; third limiting groove 315; first limiting sub-groove 316; second limiting sub-groove 317; mounting surface 318; mounting portion 319 of the first flow guide member;

second flow guide member 4; second flow guide member body 41; flow guide surface 411 of the second flow guide member body; pressing-abutting surface 412 of the second flow guide member body; mounting portion 42 of the second flow guide member; upstream transition air channel 43; downstream transition air channel 5;

diffuser 6; air outlet channel 61;

driving member 7; output shaft 71;

sealing member 8; first sealing member 81; second sealing member 82;

bearing seat 9; main body portion 91; bearing mounting groove 92; bearing seat through hole 93; outer ring portion 94; connection portion 95; first connection sub-segment 951; second connection sub-segment 952; support post 96; first bearing 10.

DETAILED DESCRIPTION

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the accompanying drawings are illustrative only, and are intended to explain, rather than limiting the present disclosure.

Various embodiments or examples for implementing different structures of the present disclosure are provided below. In order to simplify the description of the present disclosure, components and configurations of specific examples are described below. These specific examples are merely for the purpose of illustration, rather than limiting the present disclosure. Further, the same reference numerals and/or reference letters may appear in different examples of the present disclosure for the purpose of simplicity and clarity, instead of indicating a relationship between different embodiments and/or the discussed configurations. In addition, the present disclosure provides examples of various specific processes and materials. However, applications of other processes and/or the use of other materials are conceivable for those of ordinary skill in the art.

A fan assembly 100 according to embodiments in a first aspect of the present disclosure will be described below with reference to FIG. 1 to FIG. 17. The fan assembly may be used in a vacuum cleaner. The vacuum cleaner may be a handheld vacuum cleaner, which is not limited here.

Figure 2:
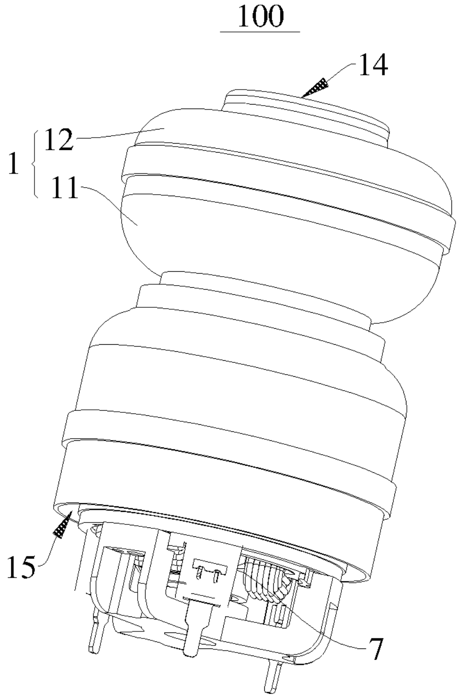
FIG. 2 is a schematic view of a fan assembly according to an embodiment of the present disclosure.
Figure 3:
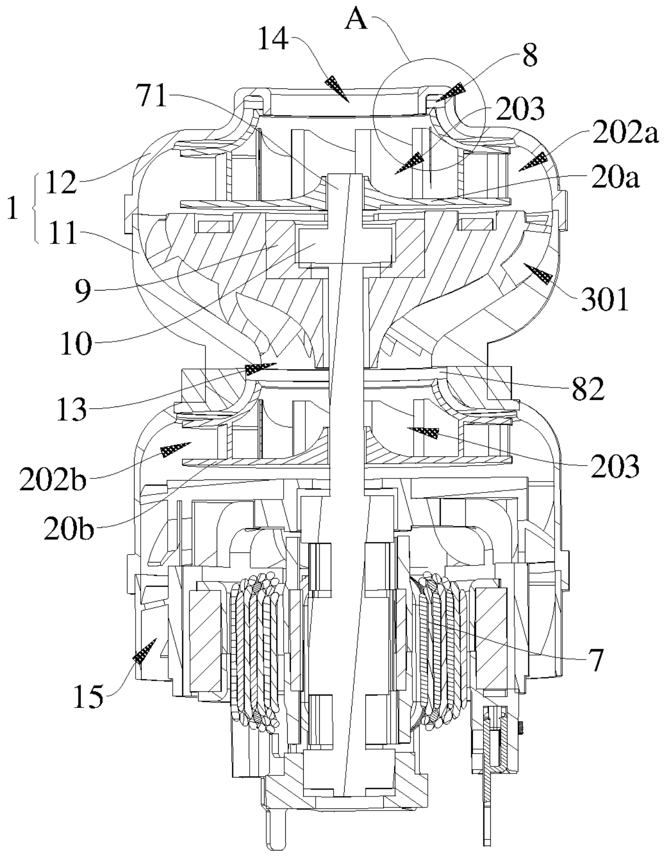
FIG. 3 is a cross-sectional view of the fan assembly shown in FIG. 2.

As illustrated in FIG. 1 to FIG. 3, the fan assembly 100 according to embodiments of the present disclosure is provided. The fan assembly 100 includes a housing 1, an impeller assembly 2, a first flow guide member 3, and a driving member 7.

In some embodiments, at least part of the impeller assembly 2 is accommodated in the housing 1. That is, the impeller assembly 2 may be completely accommodated inside the housing 1 to better protect the impeller assembly 2 through the housing 1, which improves anti-interference capability and stability of the impeller assembly 2. The impeller assembly 2 includes a plurality of impellers 20 connected in series in an airflow flowing direction of the fan assembly 100. That is, when the airflow passes through the fan assembly 100, the airflow flows through the plurality of impellers 20 successively. It can be understood that the airflow passing through the impellers 20 can achieve a better pressurization effect. Therefore, when the airflow flows through the plurality of impellers 20, pressurization for multiple times are realized. In this way, the plurality of impellers 20 can better improve a vacuum degree inside the housing 1 under a same rotation speed, i.e., increase a pressure difference between an outside and an inside of the fan assembly 100, allowing air outside the fan assembly 100 to enter an interior of the housing 1 more quickly, further improving a suction force of the fan assembly 100, and improving the dust absorption efficiency of the vacuum cleaner.

As illustrated in FIG. 3, the first flow guide member 3 is adapted to guide and discharge output air of an impeller 20 on an upstream side to an impeller 20 on a downstream side. The upstream side and the downstream side herein refer to positions relative to the first flow guide member 3 in the airflow flowing direction of the fan assembly 100. That is, the first flow guide member 3 is located downstream of the airflow of the impeller 20 on the upstream side, and the impeller 20 on the downstream side is located downstream of the airflow of the first flow guide member 3. Therefore, through the first flow guide member 3, the output air of the impeller 20 on the upstream side can be better adjusted, for example, an air output angle of the impeller 20 on the upstream side and the like are adjusted. Therefore, after the adjustment of the first flow guide member 3, the output air of the impeller 20 on the upstream side may flow to the impeller 20 on the downstream side in a certain direction, which may better reduce airflow loss and facilitates the improvement of the aerodynamic performance of the fan assembly 100.

Further, the first flow guide member 3 has a diameter decreasing in a direction from the impeller 20 on the upstream side towards the impeller 20 on the downstream side. That is, a diameter of an end of the first flow guide member 3 adjacent to the impeller 20 on the upstream side is greater than a diameter of an end of the first flow guide member 3 adjacent to the impeller 20 on the downstream side. Therefore, a radial dimension of the first flow guide member 3 may be better reduced to reduce a radial dimension of the fan assembly 100, which realizes a smaller radial dimension occupied by the fan assembly 100 in the vacuum cleaner, and a lighter weight of the first flow guide member 3 to achieve a lightweight design of the fan assembly 100.

As illustrated in FIG. 3, the driving member 7 may be configured to drive the impeller 20 to rotate. That is, the driving member 7 is connected to each of the plurality of impellers 20 in a transmission manner. Therefore, a rotation speed of the impeller 20 may be controlled by controlling the power of the driving member 7 to accurately adjust a magnitude of the suction force of the fan assembly 100.

Figure 14:
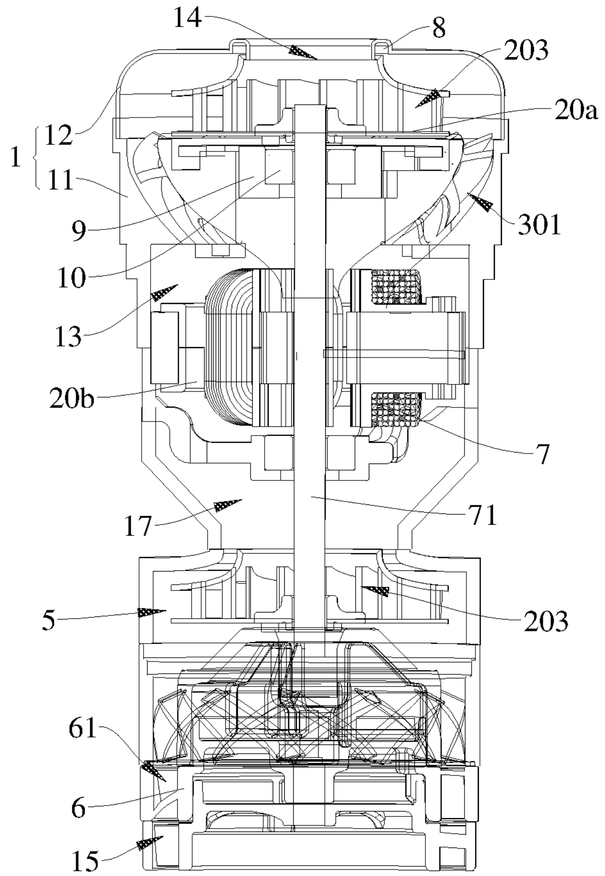
FIG. 14 is a cross-sectional view of the fan assembly shown in FIG. 13.

According to some embodiments of the present disclosure, as illustrated in FIG. 3 and FIG. 14, the plurality of impellers 20 is coaxially arranged in an axial direction of the fan assembly 100. That is, axes of the plurality of impellers 20 are located on a same straight line, which may reduce space occupied by the impeller assembly 2 in a radial direction, reducing the radial dimension of the fan assembly 100 and realizing a lightweight design of the vacuum cleaner. In addition, an output shaft 71 of the driving member 7 may be coaxial with the plurality of impellers 20, and the output shaft 71 of the driving member 7 may be connected to each of a plurality of impellers 20 in a transmission manner. This can reduce the number of the driving member 7, save the space occupied by the driving member 7, and further reduce the size of the fan assembly 100, which is conducive to the lightweight design of the vacuum cleaner and low investment cost.

Further, when the plurality of impellers 20 are fixedly connected to the output shaft 71 of the same driving member 7, under same rotation condition of the driving member 7, a high vacuum degree can be formed in the fan assembly 100 by pressurizing the airflow through the plurality of impellers 20, which can improve the suction force of the fan assembly 100 and further improve the dust absorption efficiency of the vacuum cleaner. Therefore, compared with a fan in the related art, under working condition with the same suction force, the power of the driving member 7 is lower, i.e., a rotating speed of the output shaft 71 is smaller. Therefore, noise caused by rotation of the output shaft 71 can be better controlled. Meanwhile, power consumption of the fan assembly 100 is reduced, which facilitates improvement of use experience of the vacuum cleaner.

According to some embodiments of the present disclosure, the impeller 20 has an impeller inlet 201 extending in the axial direction of the fan assembly 100 and an impeller outlet 202 located on an outer periphery of the impeller 20. That is, under driving of the driving member 7, the airflow may enter the interior of the impeller 20 through the impeller inlet 201, i.e., the airflow at the impeller inlet 201 flows in the axial direction of the fan assembly 100, and is discharged through the impeller outlet 202 in a radial direction of the fan assembly 100, i.e., axial input air may be better adjusted to radial output air through the impeller 20.

Figure 5:
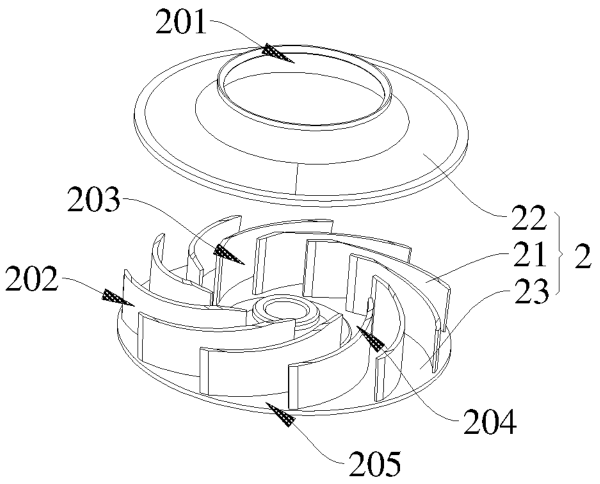
FIG. 5 is an exploded view of an impeller of a fan assembly according to an embodiment of the present disclosure.
Figure 6:
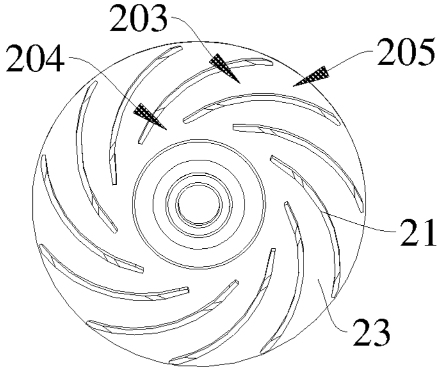
FIG. 6 is a top view of an impeller disk of an impeller according to an embodiment of the present disclosure.

According to some embodiments of the present disclosure, as illustrated in FIG. 5 and FIG. 6, the impeller 20 includes an impeller cover 22, an impeller disk 23, and a plurality of vanes 21. In some embodiments, the impeller inlet 201 is formed on the impeller cover 22. The impeller inlet 201 may be opened in an axial direction of the impeller 20. The impeller disk 23 faces and is spaced from the impeller cover 22 in the axial direction of the impeller 20. An impeller air channel 203 is defined between the impeller disk 23 and the impeller cover 22. An inner end of the impeller air channel 203 in the radial direction may be in communication with the impeller inlet 201. The impeller outlet 202 is formed in an outer end of the impeller air channel 203 in the radial direction. In this case, the impeller air channel 203 is formed in an annular shape. When the airflow flows through the impeller air channel 203, the airflow is substantially outputted from inside to outside in the radial direction. A specific air output direction is related to a shape of the vanes 21. The plurality of vanes 21 is arranged at intervals in the air channel in a circumferential direction of the impeller inlet 201. Each of the plurality of vanes 21 may be formed in an arc shape that is bent radially with respect to the impeller 20. Any two adjacent vanes 21 in the circumferential direction, the impeller cover 22, and the impeller disk 23 define an impeller sub-outlet 205. That is, a plurality of impeller sub-outlets 205 together forms the impeller outlet 202, allowing air to flow out of the impeller 20 evenly in various directions.

Further, the first flow guide member 3 is adapted to guide output air of an impeller outlet 202 on an upstream side to flow to an impeller inlet 201 on a downstream side at least in the axial direction of the fan assembly 100. That is, the first flow guide member 3 is adapted to adjust radial output air of the impeller 20 on the upstream side into an airflow at least partially flowing in the axial direction. For example, the first flow guide member 3 may guide the output air of the impeller outlet 202 on the upstream side to be completely adjusted into an airflow flowing in the axial direction; or the output air of the impeller outlet 202 on the upstream side is adjusted by the first flow guide member 3 to form an airflow having a part flowing in the axial direction of the fan assembly 100. It can be understood that an impeller inlet 201 on the downstream side extends in the axial direction of the fan assembly 100, which enables the airflow, which flows in the axial direction of the fan assembly 100 after being adjusted by the first flow guide member 3, to enter the impeller inlet 201 on the downstream side more smoothly, and may better avoid gas field disorder caused by inconsistency between the airflow direction and a direction of the impeller inlet 201, to better reduce gas flow loss and improve the aerodynamic performance of the fan assembly 100.

According to some embodiments of the present disclosure, referring to FIG. 3, the first flow guide member 3 and an inner wall surface of the housing 1 define a flow guide channel 301. The flow guide channel 301 is arc-shaped. In the direction from the impeller 20 on the upstream side towards the impeller 20 on the downstream side, the flow guide channel 301 is offset towards the axial direction of the fan assembly 100. That is, when gas flows in the flow guide channel 301 towards the impeller 20 on the downstream side, an included angle between a flow direction of the gas and the axial direction of the fan assembly 100 gradually decreases, i.e., angular deflection of the airflow may be better achieved through the flow guide channel 301 in the arc-shaped, which enables the airflow passing through the first flow guide member 3 to flow in a certain direction to the impeller 20 on the downstream side. Therefore, a deflection angle of the flow guide channel 301 may be controlled based on an air input angle of the impeller 20 on the downstream side, to enable the airflow passing through the first flow guide member 3 to flow to the impeller 20 on the downstream side more smoothly, and to better avoid the gas field disorder caused by inconsistency between the airflow direction and the direction of the impeller inlet 201. In this way, the gas flow loss is reduced, and the aerodynamic performance of the fan assembly 100 is improved.

A flow guide inlet and a flow guide outlet are formed at two ends of the flow guide channel 301, respectively. An opening direction of the flow guide inlet is parallel to an opening direction of an impeller outlet 202 of an upstream impeller 20. An opening direction of the flow guide outlet is parallel to an opening direction of an impeller inlet 201 of a downstream impeller 20. The flow guide channel 301 is arc-shaped. That is, the flow guide inlet may be opened substantially in a radial direction of a first-level impeller **20*a*, the flow guide outlet may be opened substantially in an axial direction of a second-level impeller 20*b*, and the flow guide channel 301 may convert output air of a first-level impeller outlet 202*a* from the radial direction to the axial direction to deliver the output air to the second-level impeller 20*b*. Therefore, the airflow inside the fan assembly 100** may be more efficient and smoother.

According to some embodiments of the present disclosure, a maximum diameter a of the first flow guide member 3 and a diameter b of the impeller 20 on the upstream side satisfy: $1.05 \leq a/b \leq 0.2$. That is, a ratio of the maximum diameter a of the first flow guide member 3 to the diameter b of the impeller 20 on the upstream side is controlled in a range of 1.05 to 1.2. For example, the ratio of the maximum diameter a of the first flow guide member 3 to the diameter b of the impeller 20 on the upstream side may be 1.05, 1.1, 1.15, 1.2, etc., which is not limited here. That is, a diameter of an end of the first flow guide member 3 adjacent to the impeller 20 on the upstream side is greater than a diameter of the impeller 20 on the upstream side, i.e., an outer peripheral wall of the first flow guide member 3 protrudes beyond an outer peripheral wall of the impeller 20 on the upstream side. Therefore, a part of the first flow guide member 3 beyond the outer peripheral wall of the impeller 20 on the upstream side may better receive the output air of the impeller 20 on the upstream side to ensure an effect of adjusting the airflow direction by the first flow guide member 3.

According to some embodiments of the present disclosure, a minimum diameter c of the first flow guide member 3 and an inner diameter d of the impeller inlet 201 of the impeller 20 on the downstream side satisfy: c=d. That is, the diameter of an end of the first flow guide member 3 adjacent to the impeller 20 on the downstream side is the same as a diameter of the impeller inlet 201 of the impeller 20 on the downstream side. Therefore, the end of the first flow guide member 3 adjacent to the impeller 20 on the downstream side may be aligned with the impeller inlet 201 on the downstream side, which is beneficial to reduce the air flow loss.

Figure 7:
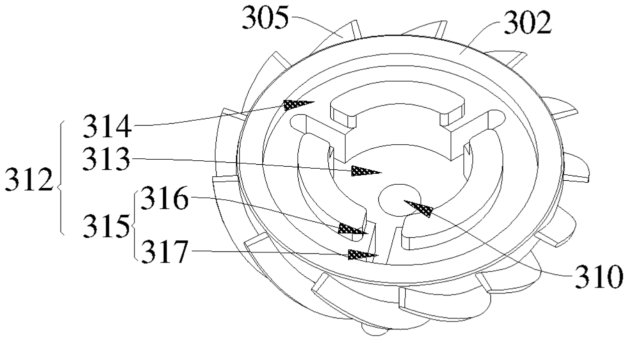
FIG. 7 is a schematic diagram of a first flow guide member of a fan assembly according to an embodiment of the present disclosure, viewed from an angle.
Figure 8:
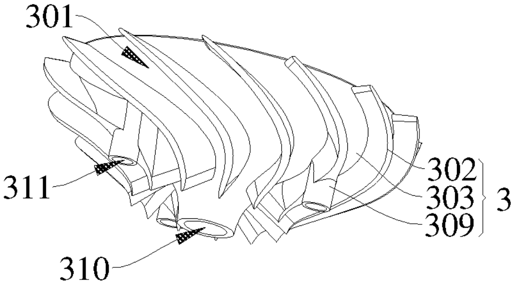
FIG. 8 is a schematic diagram of the first flow guide member shown in FIG. 7, viewed from another angle.

According to some embodiments of the present disclosure, with reference to FIG. 7 and FIG. 8, the first flow guide member 3 includes a first flow guide member body 302 and a plurality of flow guide ribs 303 arranged at intervals along an outer peripheral wall of the first flow guide member body 302. An end of the flow guide rib 303 away from the first flow guide member body 302 abuts against an inner surface of the housing 1 to define the flow guide channel 301 between two adjacent flow guide ribs 303, the first flow guide member body 302, and the inner surface of the housing 1. Therefore, a plurality of flow guide channels 301 may be formed on an outer peripheral side of the first flow guide member 3 through cooperation between the first flow guide member 3 and the housing 1, which enables the output air of the impeller 20 on the upstream side to flow towards the impeller 20 close to the downstream side through a plurality of flow guide channels 301. Therefore, while the effect of adjusting the air flow direction is ensured, the output air of the impeller 20 on the upstream side at a plurality of positions in the radial direction is all enabled to pass through the flow guide channels 301 and flow to the impeller 20 on the downstream side in a certain direction under guidance of the flow guide channels 301, to ensure guide efficiency of the first flow guide member 3. In addition, the first flow guide member 3 has a plurality of air output positions in the circumferential direction, enabling more uniform output air of the first flow guide member 3 and a stable gas field.

Further, referring to FIG. 8, the flow guide rib 303 extends in an arc shape. A deflection angle of the flow guide rib 303 relative to the axial direction of the fan assembly 100 decreases in the direction from the impeller 20 on the upstream side towards the impeller 20 on the downstream side. Therefore, when the gas flows in the flow guide channel 301 towards the impeller 20 on the downstream side, the included angle between the flow direction of the gas under guidance of the flow guide ribs 303 and the axial direction of the fan assembly 100 gradually decreases. In one specific example, an end of the flow guide rib 303 away from the impeller 20 on the upstream side extends in the axial direction of the fan assembly 100, which enables at least part of the airflow passing through the flow guide channel 301 to flow to the impeller 20 on the downstream side in the axial direction of the fan assembly 100, and may better avoid gas field disorder caused by output air turbulence of the impeller 20 on the upstream side, to better reduce the gas flow loss and improve the aerodynamic performance of the fan assembly 100.

According to some embodiments of the present disclosure, the plurality of flow guide ribs 303 includes a first flow guide rib (not shown) and a second flow guide rib (not shown). A length over which the first flow guide rib extends is greater than a length over which the second flow guide rib extends. The first flow guide rib and the second flow guide rib are alternately arranged at intervals along the outer peripheral wall of the first flow guide member body 302. That is, in a circumferential direction of the first flow guide member body 302, the second flow guide rib is disposed between every two adjacent first flow guide ribs, the first flow guide rib is disposed between every two adjacent second flow guide ribs, and the flow guide channel 301 is defined between the first flow guide rib and the second flow guide rib that are adjacent to each other. Therefore, a weight of the first flow guide member 3 may be better reduced while a flow guide effect on the airflow is ensured. Meanwhile, production materials of the first flow guide member 3 may be saved, which facilitates the lightweight design of the fan assembly 100 and a low investment cost Optionally, an extending direction of the first flow guide rib and an extending direction of the second flow guide rib are consistent. Therefore, an airflow direction in an airflow channel between the first flow guide rib and the second flow guide rib is consistent, which enables a consistent direction of output air of the flow guide channel 301 through which the airflow is discharged, to avoid loss caused by airflow disorder and improve the performance of the fan assembly 100.

Optionally, an end of the first flow guide rib adjacent to the impeller 20 on the upstream side and an end of the second flow guide rib adjacent to the impeller 20 on the upstream side are located in a same plane. That is, air inlets 14 of the plurality of flow guide channels 301 are located in the same plane. Therefore, the output air of the impeller 20 on the upstream side can enter the plurality of flow guide channels 301 evenly, which is beneficial to improve the gas flowing stability.

In addition, a spacing between an end of the first flow guide rib away from the impeller 20 on the upstream side and the impeller 20 on the upstream side is greater than a spacing between an end of the second flow guide rib away from the impeller 20 on the upstream side and the impeller 20 on the upstream side. It can be understood that the first flow guide member 3 is in the shape of an inverted cone. Therefore, by setting that an extending length of the second flow guide rib is smaller than an extending length of the first flow guide rib, the airflow between the first flow guide rib and the second flow guide rib enters between two adjacent first flow guide ribs near a side of the flow guide ribs 303 away from the impeller 20 on the upstream side, which may better adapt the first flow guide member 3 in the shape of the inverted cone, maintain a width of an air outlet 15 of the flow guide channel 301, and better avoid airflow loss caused by the narrowing of the flow guide channel 301.

Optionally, a length f of the second flow guide rib and a length g of the first flow guide rib satisfy: $0.3 \leqslant f/g \leqslant 0.7$, i.e., a ratio of the length of the second flow guide rib to the length of the first flow guide rib is controlled in a range of 0.3 to 0.7. For example, the ratio of the length of the second flow guide rib to the length of the first flow guide rib may be 0.3, 0.4, 0.5, 0.6, 0.7, etc., which is not limited here. When the ratio of the length of the second flow guide rib to the length of the first flow guide rib is too small, the length of the second flow guide rib is too small, and thus, a flow guide channel 301 between the first flow guide rib and the second flow guide rib is too short, which is disadvantage to the air guidance. When the ratio of the length of the second flow guide rib to the length of the first flow guide rib is too large, the length of the second flow guide rib is too large, and therefore, the first flow guide rib and the second flow guide rib cannot be adapted to a shape of the first flow guide member 3. Therefore, by controlling the ratio of the length of the second flow guide rib to the length of the first flow guide rib to be in a range of 0.3 to 0.7, the airflow loss caused by the narrowing of the flow guide channel 301 may be better avoided while ensuring the flow guide effect on the gas.

Optionally, the flow guide rib 303 has a first extending segment 306 adjacent to the impeller 20 on the upstream side, a second extending segment 307 adjacent to the impeller 20 on the downstream side, and a connection segment 308 connecting the first extending segment 306 and the second extending segment 307. The first extending segment 306 and the second extending segment 307 each has a thickness decreasing in a direction away from the connection segment 308. That is, in an extending direction of the flow guide rib 303, thicknesses of two tail ends are smaller than a thickness at a middle position of the first flow guide member 3. Therefore, when the output air of the impeller 20 on the upstream side flows into the flow guide channel 301, a smaller thickness of an end of the first extending segment

306 away from the connection segment 308 can better reduce gas flow resistance and reduce the gas flow loss.

Further, since the second extending segment 307 has a thickness decreasing in a direction away from the connection segment 308, a spacing between two adjacent flow guide ribs 303 increases in a direction away from the impeller 20 on the upstream side, which can well solve the gradual narrowing of the flow guide channel 301 caused due to the first flow guide member body 302 being in the shape of inverted cone, and thus better reduce the airflow loss.

In some embodiments, an outer peripheral wall of the first flow guide member body 302 has an outer limiting protrusion 309 disposed thereon. A rotation-limiting groove 16 matching the outer limiting protrusion 309 is formed on the inner surface of the housing 1. That is, through cooperation between the outer limiting protrusion 309 and the rotation-limiting groove 16, i.e., the outer limiting protrusion 309 is placed in the rotation-limiting groove 16, and the first flow guide member 3 is therefore fixed relative to the housing 1 and prevented from rotating relative to the housing 1 to ensure a flow guide effect of the first flow guide member 3.

Further, referring to FIG. 8, a plurality of outer limiting protrusions 309 and a plurality of rotation-limiting grooves 16 are provided. The plurality of outer limiting protrusions 309 are arranged at intervals along the outer peripheral wall of the first flow guide member body 302. Therefore, a fixing effect of the housing 1 on the first flow guide member 3 may be better improved to further ensure the flow guide effect of the first flow guide member 3. In one specific example, the outer limiting protrusion 309 extends in the axial direction of the fan assembly 100. Therefore, the outer limiting protrusion 309 may be inserted into the rotation-limiting groove 16 in the axial direction of the fan assembly 100, which is beneficial to reduce the assembly difficulty of the first flow guide member 3.

In some embodiments, at least part of the outer limiting protrusion 309 is disposed on the flow guide rib 303. Therefore, the flow guide rib 303 and the outer limiting protrusion 309 share a part of structure, which may better save material investment and reduce the weight of the first flow guide member 3. In addition, resistance of the outer limiting protrusion 309 to the airflow in the flow guide channel 301 may be better reduced to reduce the airflow loss and improve the performance of the fan assembly 100.

The flow guide rib 303 may be an integral structure, i.e., the first flow guide member body 302, the flow guide rib 303, and the outer limiting protrusion 309 may be integrally formed. An integrally formed structure may not only ensure structural and performance stability of the first flow guide member body 302, the flow guide rib 303, and the outer limiting protrusion 309, and is also convenient for forming and simple to manufacture, which saves redundant assembly parts and connection processes, greatly improves assembly efficiency of the first flow guide member body 302, the flow guide rib 303, and the outer limiting protrusion 309, and ensures connection reliability of the first flow guide member body 302, the flow guide rib 303, and the outer limiting protrusion 309. Moreover, the integrally formed structure has higher overall strength and stability, is more convenient for assembling, and has a longer service life.

According to some embodiments of the present disclosure, with reference to FIG. 3 and FIG. 14, the housing 1 has an accommodation cavity 13 inside and has an air inlet 14 and an air outlet 15 that are in communication with the accommodation cavity 13. The impeller 20 on the upstream side is disposed adjacent to the air inlet 14. The impeller 20 on the downstream side is disposed adjacent to the air outlet 15. The air inlet 14 is in communication with the impeller inlet 201 of the impeller 20 on the upstream side. The impeller outlet 202 of the impeller 20 on the downstream side is in communication with the air outlet 15. That is, after air outside the fan assembly 100 enters the accommodation cavity 13 through the air inlet 14, the air is successively pressurized through the plurality of impellers 20 and then discharged through the air outlet 15. Therefore, a vacuum degree in the accommodation cavity 13 may be better improved, i.e., the pressure difference between the outside and the inside of the fan assembly 100 is increased, which makes the air outside the fan assembly 100 enters the interior of the housing 1 more quickly, to further improve the suction force of the fan assembly 100 and then improve the dust absorption efficiency of the vacuum cleaner.

In some embodiments, a cavity wall of the accommodation cavity 13 smoothly transitions to an inner peripheral wall of the impeller inlet 201 of the impeller 20 on the downstream side. That is, at the impeller inlet 201 of the impeller 20 on the downstream side, an inner diameter of the cavity wall of the accommodation cavity 13 is the same as the inner diameter of the impeller inlet 201, which enables the airflow to flow into the impeller inlet 201 more stably to better avoid the gas disorder and reduce the airflow loss.

Figure 4:
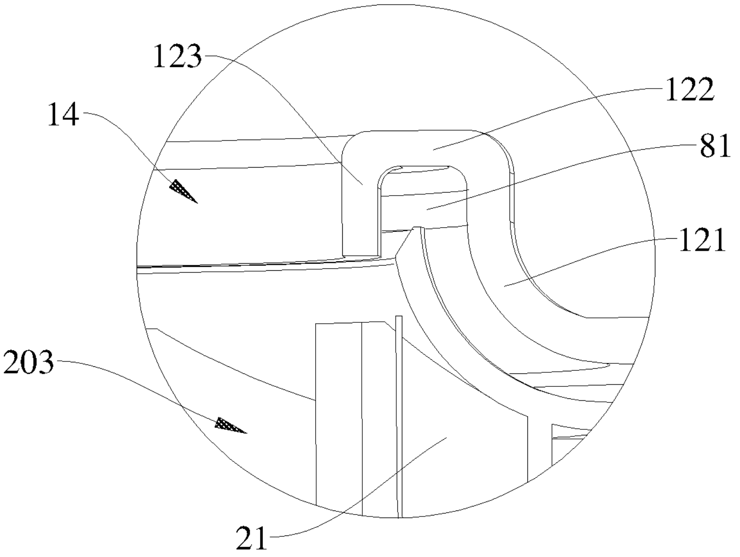
FIG. 4 is an enlarged view of a circled part A in FIG. 3.

According to some embodiments of the present disclosure, with reference to FIG. 3 and FIG. 4, the fan assembly 100 further includes a sealing member 8. The sealing member 8 is filled between an outer peripheral edge of the impeller inlet 201 and the cavity wall of the accommodation cavity 13. Therefore, the airflow may be better prevented from flowing through a gap between the impeller inlet 201 and the cavity wall of the accommodation cavity 13, to reduce the airflow loss and improve the aerodynamic performance of the fan assembly 100.

In addition, in an assembly process of the impeller 20, the sealing member 8 may better prevent collision damage directly caused by the impeller 20 and the housing 1, and during operation of the fan assembly 100, the sealing member 8 may better prevent resonance noise generated by the impeller 20 abutting against the housing 1, which is beneficial to improve overall structural stability of the fan assembly 100, and may better reduce the resonance noise and improve tranquility of the fan assembly 100.

In some embodiments, with reference to FIG. 3 and FIG. 14, the plurality of impellers 20 at least includes a first-level impeller 20*a* and a second-level impeller 20*b*. The first-level impeller 20*a* is disposed adjacent to the air inlet 14. The first flow guide member 3 is disposed on a downstream side of the first-level impeller 20*a*. The second-level impeller 20*b* is disposed on a downstream side of the first flow guide member 3. The driving member 7 is disposed on a downstream side of the second-level impeller 20*b*.

That is, in the airflow flowing direction of the fan assembly 100, pressurization is firstly performed through the first-level impeller 20*a*. The airflow pressurized by the first-level impeller 20*a* is guided and discharged to the second-level impeller 20*b* through the first flow guide member 3, is pressurized again under the action of the second-level impeller 20*b*, and is discharged out of the fan assembly 100 through the impeller outlet 202 and the air outlet 15. That is, the airflow is pressurized twice in the fan assembly 100. Therefore, a vacuum degree in the accommodation cavity 13 may be better improved, i.e., the pressure difference between the outside and the inside of the fan assembly 100 is increased, which enables the air outside the fan assembly 100 to enter the interior of the housing 1 more quickly, to further improve the suction force of the fan assembly 100 and thus improve the dust absorption efficiency of the vacuum cleaner. In a specific example, a rotation speed of an output shaft 71 of the driving member 7 in the present disclosure is in a range of 60,000 revolutions per minute to 100,000 revolutions per minute, and the suction force of the vacuum cleaner exceeds a suction force of a fan of 120,000 revolutions per minute to 180,000 revolutions per minute in the related art.

In some embodiments, the number of vanes 21 of the first-level impeller 20*a* is N1. The second-level impeller 20*b* is disposed downstream of the first flow guide member 3. The number of vanes 21 of the second-level impeller 20*b* is N2, and the number of flow guide ribs 303 of the first flow guide member 3 is N3, where N3>N1, and N3>N2. That is, the number of the flow guide ribs 303 of the first flow guide member 3 is greater than the number of vanes 21 of the impeller 20 adjacent thereto. In this way, a flow cross-section area of a flow guide sub-channel 301 defined by two adjacent flow guide ribs 303 in a circumferential direction is smaller than a flow cross-section area of an impeller air sub-channel 203 defined by two adjacent vanes 21 in a circumferential direction. Therefore, a flow rate of output air of the impeller outlet 202 of the first-level impeller 20*a* when flowing through the flow guide sub-channel 301 of the first flow guide member 3 can be increased, which is beneficial to improve the flowing efficiency of the airflow between the first-level impeller 20*a* and the second-level impeller 20*b*.

Further, the number of vanes 21 of the first-level impeller 20*a* and the number of vanes 21 of the second-level impeller 20*b* satisfy a relationship: N1>N2. Therefore, since the first-level impeller 20*a* is closer to the air inlet 14 of the housing 1 in the airflow flowing direction, it is beneficial to improve the suction force of the fan assembly 100 by setting that the number of vanes 21 of the first-level impeller 20*a* is greater than the number of vanes 21 of the second-level impeller 20*b*, and the smaller number of vanes 21 of the second-level impeller 20*b* enables a larger flow cross-section area of a second-level impeller sub-outlet 205, which is beneficial to reduce resistance to the airflow inside the housing 1 to improve the air exhaust efficiency.

In some embodiments, an outer diameter of the first-level impeller 20*a* is D11, and a spacing between the first-level impeller 20*a* and the second-level impeller 20*b* in the axial direction of the fan assembly 100 is L1, where 1.27≤ D11/L1≤ 1.87. For example, a ratio of D11 to L1 may be 1.27, 1.37, 1.47, 1.67, or 1.87, which avoids a case where the ratio of D11 to L1 is too small, for example, smaller than 1.27, and space for mounting the first flow guide member 3 between the first-level impeller 20*a* and the second-level impeller 20*b* is too small and adversely affects the efficiency of the airflow passing through the flow guide channel, and avoids a case where the ratio of D11 to L1 is too large, for example, greater than 1.87, and a distance between the first-level impeller 20*a* and the second-level impeller 20*b* is too large, causing large resistance to the airflow when passing through the flow guide channel 301 and large air volume loss caused, and reducing the suction force of the fan assembly 100.

Further, the outer diameter of the first-level impeller 20*a* is D11, where 37 mm≤ D11≤ 43 mm. For example, the outer diameter D11 of the first-level impeller 20*a* may be 37 mm, 38 mm, 40 mm, 41 mm, or 43 mm. Therefore, it may avoid a case where the outer diameter of the first-level impeller 20*a* is too large, for example, greater than 43 mm, and an overall radial dimension of the fan assembly 100 is too large, occupies large space, and is disadvantageous to miniaturization and portability development of the vacuum cleaner, and also avoid a case where the outer diameter of the first-level impeller 20*a* is too small, for example, smaller than 37 mm, and wind power generated by the first-level impeller 20*a* is too small, causing a too small suction force of the vacuum cleaner.

According to some embodiments of the present disclosure, an outer diameter of the second-level impeller 20*b* is D21, and the spacing between the first-level impeller 20*a* and the second-level impeller 20*b* in the axial direction of the fan assembly 100 is L1, where 1.27≤ D21/L1≤ 1.87. For example, a ratio of D21 to L1 may be 1.27, 1.37, 1.47, 1.67, or 1.87. Therefore, it avoids a case where the ratio of D21 to L1 is too small, for example, smaller than 1.27, and the space for mounting the first flow guide member 3 between the first-level impeller 20*a* and the second-level impeller 20*b* is too small and adversely affects the efficiency of the airflow passing through the flow guide channel, and a case where the ratio of D21 to L1 is too large, for example, greater than 1.87, and the distance between the first-level impeller 20*a* and the second-level impeller 20*b* is too large causing large resistance to the airflow when passing through the flow guide channel 301 and a large air volume loss caused, and reducing the suction force of the fan assembly 100.

Further, the outer diameter D21 of the second-level impeller 20*b* satisfies: 37 mm ≤ D21≤ 43 mm. For example, the outer diameter D21 of the second-level impeller 20*b* may be 37 mm, 38 mm, 40 mm, 41 mm, or 43 mm. Therefore, it may avoid a case where the outer diameter of the second-level impeller 20*b* is too large, for example, greater than 43 mm, and the overall radial dimension of the fan assembly 100 is too large, occupies large space, and is disadvantage to the miniaturization and portability development of the vacuum cleaner. It may also avoid a case where the outer diameter of the second-level impeller 20*b* is too small, for example, smaller than 37 mm, and wind power generated by the second-level impeller 20*b* is too small, causing a too small suction force of the vacuum cleaner.

In some embodiments, a spacing between the first flow guide member 3 and the second-level impeller 20*b* in the axial direction of the fan assembly 100 is L2, and a spacing between the first-level impeller 20*a* and the second-level impeller 20*b* in the axial direction of the fan assembly 100 is L1, where 0.13 ≤ L2/L1≤ 0.26. For example, a ratio of L2 to L1 may be 0.13, 0.18, 0.2, 0.25, or 0.26. Therefore, it may avoid a case where the ratio of L2 to L1 is too small, for example, smaller than 0.13, and the spacing between the first flow guide member 3 and the second-level impeller 20*b* in the axial direction of the fan assembly 100 is too small, causes difficulties for the airflow of the flow guide channel 301 in entering the impeller inlet 201 of the second-level impeller 20*b*, and thus reduces the flowing efficiency of the airflow. It may also avoid a case where the ratio of L2 to L1 is too large, for example, larger than 0.26, and the spacing between the first flow guide member 3 and the second-level impeller 20*b* in the axial direction of the fan assembly 100 is too large, weakens the flow guide effect of the first flow guide member 3, and forms a vortex of air between the first flow guide member 3 and the second-level impeller 20*b* to cause flowing blockage to the airflow and further increase the air volume loss.

According to some embodiments of the present disclosure, in the airflow flowing direction, a sectional area of the impeller outlet 202 of the impeller 20 located on the upstream side is greater than a sectional area of the impeller outlet 202 of the impeller 20 located on the downstream side. That is, a sectional area of the impeller outlet 202 of the first-level impeller 20*a* is greater than a sectional area of the impeller outlet 202 of the second-level impeller 20*b*. For example, when the outer diameter, i.e., a perimeter of the first-level impeller 20*a* is the same as the outer diameter, i.e., a perimeter of the second-level impeller 20*b*, a width of the impeller outlet 202 of the first-level impeller 20*a* in the axial direction of the impeller 20 may be set to be greater than a width of the impeller outlet 202 of the second-level impeller 20*b* in the axial direction of the impeller 20, and therefore, the sectional area of the impeller outlet 202 of the first-level impeller 20*a* is greater than the sectional area of the impeller outlet 202 of the second-level impeller 20*b*. Therefore, a flow rate of the airflow after successively passing through the first-level impeller 20*a* and the second-level impeller 20*b* may be significantly increased to increase the wind power to increase the suction force of the vacuum cleaner.

Further, the outer diameter of the first-level impeller 20*a* is D11, and the outer diameter of the second-level impeller 20*b* is D21, where D11=D21. That is, a radial dimension of the first-level impeller 20*a* is the same as a radial dimension of the second-level impeller 20*b*. Therefore, an overall structure of the fan assembly 100 may have an identical diameter at different positions in the axial direction, which facilitates miniaturization of the overall structure of the fan assembly 100 on the premise of ensuring that the fan assembly 100 can provide a sufficient suction force.

In some embodiments, an inner diameter of the first-level impeller 20*a* is D12, where 18 mm≤ D12≤ 21 mm. For example, the inner diameter of the first-level impeller 20*a* may be 18 mm, 19 mm, 20 mm, or 21 mm. An inner diameter of the second-level impeller 20*b* is D22, where 18 mm≤ D21≤ 21 mm. For example, the inner diameter of the second-level impeller 20*b* may be 18 mm, 19 mm, 20 mm, or 21 mm, and D12≤ D22. Here, the inner diameter of the first-level impeller 20*a* is D12, which means that an inner diameter of the impeller inlet 201 of the first-level impeller 20*a* is D12. The inner diameter of the second-level impeller 20*b* is D22, which means that an inner diameter of the impeller inlet 201 of the second-level impeller 20*b* is D22. An opening area of the impeller inlet 201 of the first-level impeller 20*a* is greater than an opening area of the impeller inlet 201 of the second-level impeller 20*b*. Since the first-level impeller 20*a* is closer to the air inlet 14 of the housing 1, it is beneficial to improve input air volume of the impeller assembly 2 by setting that the opening area of the impeller inlet 201 of the first-level impeller 20*a* is greater than the opening area of the impeller inlet 201 of the second-level impeller 20*b*. Meanwhile, under the condition that the air volume flowing through the first-level impeller 20*a* and the second-level impeller 20*b* is fixed, since the opening area of the impeller inlet 201 of the second-level impeller 20*b* is smaller, the flow rate of the airflow when flowing through the second-level impeller 20*b* is further increased, which is beneficial to improve the suction force of the vacuum cleaner. In addition, by setting that the inner diameter of the first-level impeller 20*a* and the inner diameter of the second-level impeller 20*b* are in the range of 18 mm to 21 mm, it facilitates the miniaturization of the overall structure of the fan assembly 100 in the radial direction.

According to some embodiments of the present disclosure, a width of the first-level impeller outlet 202*a* of the first-level impeller 20*a* is B11, and a width of the second-level impeller outlet 202*b* of the second-level impeller 20*b* is B21, where B11>B21. In this way, the flow rate of the airflow after passing through the first-level impeller 20*a* and the second-level impeller 20*b* successively may be significantly increased to increase the wind power to increase the suction force of the vacuum cleaner. It should be noted that the width of the impeller outlet 202 herein refers to a width of the impeller outlet 202 in the axial direction of the impeller 20, i.e., a spacing between an outer edge of the impeller cover 22 and an outer edge of the impeller disk 23 in the axial direction of the impeller 20.

Further, the width B11 of the first-level impeller outlet 202*a* and the width B21 of the second-level impeller outlet 202*b* satisfy: B21=a1*B11, where 0.6≤ a1≤ 0.9. For example, a value of a1 may be 0.6, 0.7, 0.8, or 0.9. In this way, it may not only avoid a case where the value of a1 is too small, e.g., smaller than 0.6, and therefore, the width of the second-level impeller outlet 202*b* is too small and causes difficulties in discharging the airflow flowing through the second-level impeller outlet 202*b*, but also avoid a case where the value of a1 is too large, e.g., greater than 0.9, and therefore, the width of the second-level impeller outlet 202*b* is increased and cannot satisfy the requirements for increasing the flow rate of the airflow. In conclusion, setting the value of a1 to be 0.6 ≤ a≤ 0.9 may better satisfy the requirements of the flowing efficiency of the airflow to ensure a high enough suction force of the vacuum cleaner.

Further, an air channel inlet 204 is formed in a radial inner end of the impeller air channel 203. A width of a first-level air channel inlet of the first-level impeller 20*a* is B12, and a width of a second-level air channel inlet of the second-level impeller 20*b* is B22, where B12>B22. Therefore, the flow rate of the airflow after successively passing through the first-level impeller 20*a* and the second-level impeller 20*b* may be significantly increased to increase the wind power to increase the suction force of the vacuum cleaner.

In some embodiments, the width B12 of the first-level air channel inlet and the width B22 of the second-level air channel inlet satisfy: B22=c1*B12, where 0.8≤ c1<1. For example, a value of c1 may be 0.8 or 0.9, etc. In this way, it may not only avoid a case where the value of c1 is too small, e.g., smaller than 0.8, and therefore, a flow cross-section area of an air channel of the second-level impeller 20*b* is too small and causes flowing blockage to the airflow, but also avoid a case where the value of c1 is too large, e.g., greater than 1, and therefore the flow cross-section area of the air channel of the second-level impeller 20*b* is increased to cause that an increasing effect of the second-level impeller 20*b* on the flow rate of the airflow is not significant or the second-level impeller 20*b* cannot increase the flow rate of the airflow.

According to some embodiments of the present disclosure, the number of vanes 21 of each impeller 20 is N, where 7≤ N≤ 13. For example, the number of vanes 21 of each impeller 20 may be 7, 8, 10, 12, or 13. In this way, when the vacuum cleaner is a handheld vacuum cleaner, since a volume of the fan assembly 100 of the handheld vacuum cleaner is small, i.e., the radial dimension of the impeller 20 is relatively small, setting the number of vanes 21 of the impeller 20 in a range of 7 to 13 may not only avoid a case where the number of vanes 21 is too small, for example, smaller than 7, and therefore, a driving effect of the impeller 20 on the airflow decreases, but also avoid a case where the number of vanes 21 is too large, for example, greater than 13, causing large resistance to the airflow and high noise.

In some embodiments, the number of vanes 21 of the plurality of impellers 20 decreases in the airflow flowing direction, i.e., the number of vanes 21 of the second-level impeller 20*b* is smaller than the number of vanes 21 of the first-level impeller 20*a*. In this way, air resistance of the air flow channel in the housing 1 may gradually decrease, which is beneficial to improve the air exhaust efficiency to further improve the dust absorption efficiency of the vacuum cleaner.

Further, the number of vanes 21 of the first-level impeller 20*a* is N1, where 8≤ N1 ≤ 12. For example, the number N1 of vanes 21 of the first-level impeller 20*a* may be 8, 9, 10, 11, or 12. The number of vanes 21 of the second-level impeller 20*b* is N2, where 7≤ N2≤ 11. For example, the number N2 of vanes 21 of the second-level impeller 20*b* may be 7, 8, 9, 10, or 12, and N1 and N2 satisfy: N2<N1. In this way, the air resistance of the air flow channel in the housing 1 may gradually decrease, which is beneficial to improve the air exhaust efficiency to further improve the dust absorption efficiency of the vacuum cleaner.

According to some embodiments of the present disclosure, the first-level impeller 20*a* and the second-level impeller 20*b* are located on a same side of a motor assembly in the axial direction. Therefore, the spacing between the first-level impeller 20*a* and the second-level impeller 20*b* may be shortened to shorten a length of an airflow flowing path and help to reduce the wind power loss.

In some embodiments, the spacing between the first-level impeller 20*a* and the second-level impeller 20*b* in the axial direction of the fan assembly 100 is L1, and the width of the first-level impeller outlet 202*a* of the first-level impeller 20*a* is B11, where 0.14≤ B11/L1 ≤ 0.17. For example, a value of B11/L1 may be 0.14, 0.15, 0.16, or 0.17. Therefore, it not only avoids a case where B11/L1 is too small and causes an excessively small width of the first-level impeller outlet 202*a*, and therefore, the wind resistance at the first-level impeller outlet 202*a* is too large and increases the air volume loss, but also avoids a case where B11/L1 is too large, for example, greater than 0.17, resulting in a large axial length of the fan assembly 100, which is not beneficial to miniaturization.

Further, the spacing between the first-level impeller 20*a* and the second-level impeller 20*b* in the axial direction of the fan assembly 100 is L1, and the width of the second-level impeller outlet 202*b* of the second-level impeller 20*b* is B21, where 0.14≤ B21/L1≤ 0.17. For example, a value of B21/L1 may be 0.14, 0.15, 0.16, or 0.17. Therefore, it not only avoids a case where B21/L1 is too small, resulting in an excessively small width of the second-level impeller outlet 202*b* and excessively large wind resistance at the second-level impeller outlet 202*b* and increasing the air volume loss, but also avoids a case where B21/L1 is too large, for example, greater than 0.17, resulting in a large axial length of the fan assembly 100 and going against miniaturization.

Further, the plurality of impellers 20 is disposed inside the housing 1. A ratio of a diameter of an inner wall of the housing 1 at a position radially facing the impeller disk 23 of each impeller 20 to the outer diameter of the corresponding impeller disk 23 is in a range of 1.25 to 1.43. That is, a ratio of the diameter of the inner wall of the housing 1 at a position radially facing the impeller disk 23 of the first-level impeller 20*a* to the outer diameter of the impeller disk 23 of the first-level impeller 20*a* is in a range of 1.25 to 1.43. For example, the ratio of the diameter of the inner wall of the housing 1 at a position radially facing the impeller disk 23 of the first-level impeller 20*a* to the outer diameter of the impeller disk 23 of the first-level impeller 20*a* may be 1.25, 1.3, 1.35, 1.4, or 1.43. Similarly, a ratio of a diameter of the inner wall of the housing 1 at a position radially facing the impeller disk 23 of the second-level impeller 20*b* to an outer diameter of the impeller disk 23 of the second-level impeller 20*b* is in a range of 1.25 to 1.43. For example, the ratio of the diameter of the inner wall of the housing 1 at a position radially facing the impeller disk 23 of the second-level impeller 20*b* to the outer diameter of the impeller disk 23 of the second-level impeller 20*b* may be 1.25, 1.3, 1.35, 1.4, or 1.43. Therefore, it avoids a case where a spacing between the inner wall of the housing 1 and the impeller disk 23 of each impeller 20 is too small, increasing the wind resistance and the air volume loss, and also avoids a case where the spacing between the inner wall of the housing 1 and the impeller disk 23 of each impeller 20 is too large, increasing a radial dimension of the fan assembly 100 and going against the miniaturization of the fan assembly 100.

According to some embodiments of the present disclosure, the impeller outlet 202 includes a plurality of impeller sub-outlets arranged at intervals in the circumferential direction of the impeller 20. A sectional area of an impeller sub-outlet of the impeller 20 located upstream is greater than a sectional area of an impeller sub-outlet of the impeller 20 located downstream. That is, the impeller outlet 202 of each impeller 20 may be composed of a plurality of impeller sub-outlets arranged at intervals in the circumferential direction of the impeller 20, each of the plurality of impeller sub-outlets may be defined by two adjacent vanes 21, the impeller disk 23, and the impeller disk 23 cooperatively, and a sectional area of a first-level impeller sub-outlet of the first-level impeller 20*a* is greater than a cross-sectional area of a second-level impeller sub-outlet of the second-level impeller 20*b*. Thus, an overall layout of the fan assembly 100 is beneficial to increase the wind speed to provide a stronger suction force of the vacuum cleaner.

Figure 11:
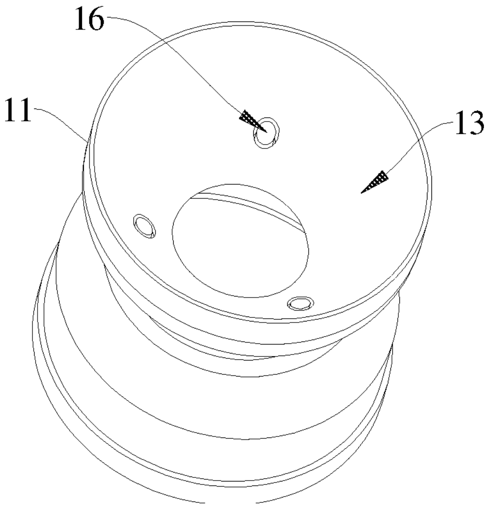
FIG. 11 is a partial schematic diagram of a housing of a fan assembly according to an embodiment of the present disclosure.
Figure 12:
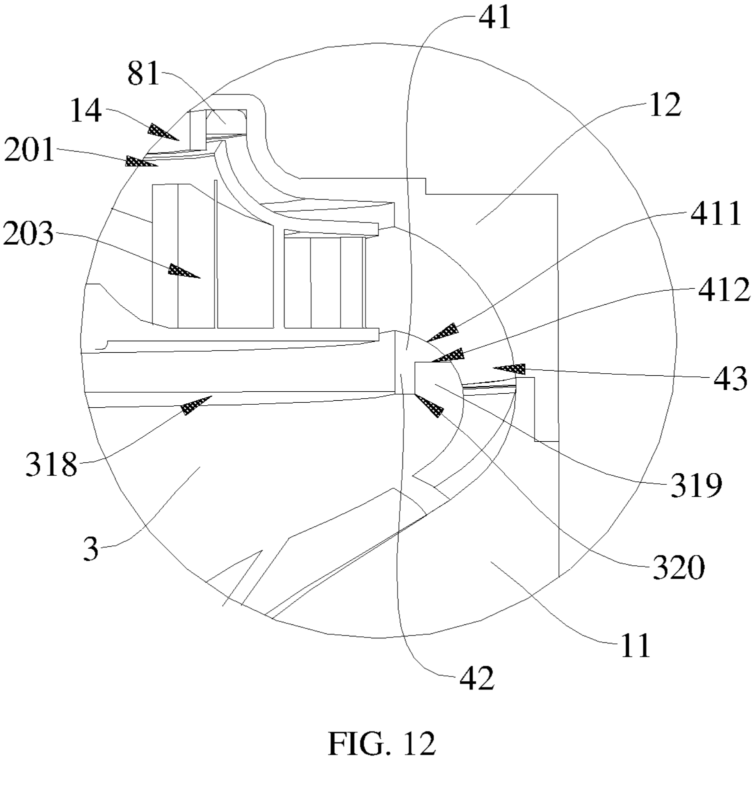
FIG. 12 is a schematic diagram of the engagement between a first flow guide member and a second flow guide member.
Figure 13:
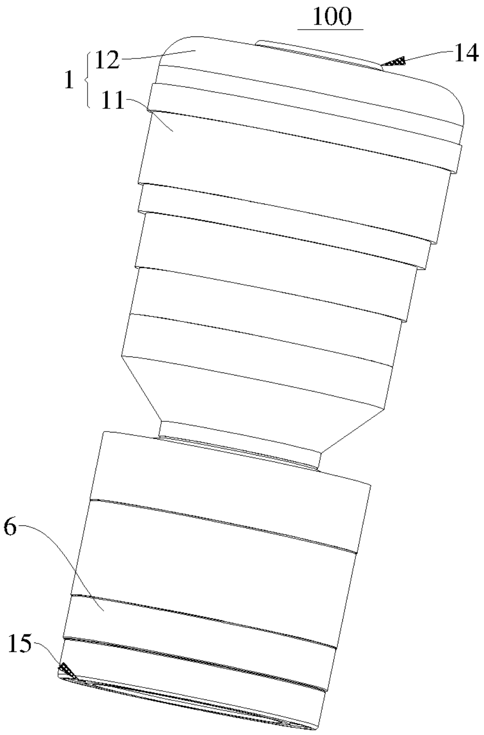
FIG. 13 is a schematic diagram of a fan assembly according to another embodiment of the present disclosure.
Figure 15:
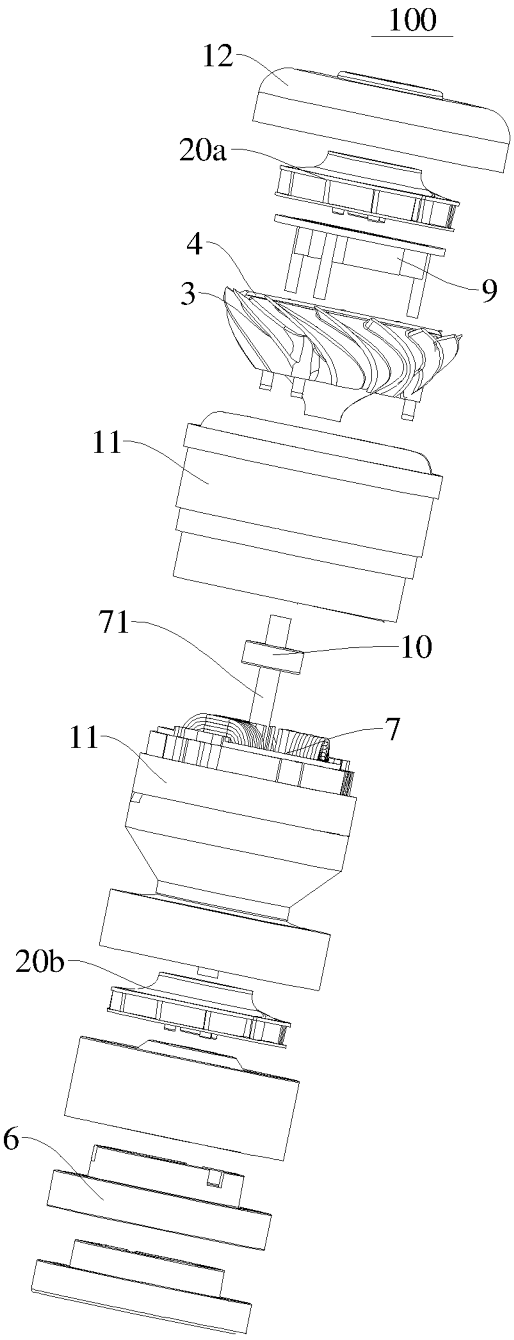
FIG. 15 is an exploded view of the fan assembly shown in FIG. 13.

According to some embodiments of the present disclosure, with reference to FIG. 11 and FIG. 15, the fan assembly 100 may further include a second flow guide member 4. The second flow guide member 4 is disposed between the first flow guide member 3 and the impeller 20 located on the upstream side of the first flow guide member 3 to guide output air of the impeller outlet 202 of the impeller 20 on the upstream side to the flow guide channel 301. In other words, the second flow guide member 4 is disposed between the first flow guide member 3 and the first-level impeller 20*a*, and the second flow guide member 4 may guide output air of the first-level impeller outlet 202*a* to the flow guide channel 301 defined by the first flow guide member 3 and the inner wall of the housing 1. In this way, by setting the second flow guide member 4, it is beneficial to reduce wind resistance between the first-level impeller outlet 202*a* and the flow guide channel 301 and reduce the wind power loss to improve the air flowing efficiency of the fan assembly 100.

According to some embodiments of the present disclosure, the second flow guide member 4 may be formed in an annular shape, and is sleeved on an outer side of the impeller 20 on the upstream side. That is, the second flow guide member 4 may be sleeved on an outer side of the first-level impeller 20*a*. For example, as illustrated in FIG. 15, the second flow guide member 4 is formed as a second flow guide ring. The second flow guide ring is sleeved on an outer peripheral side of the first-level impeller outlet 202*a* to guide the output air of the first-level impeller outlet 202*a* to the flow guide channel 301. In this way, the second flow guide member 4 can guide the flow of output air at any circumferential position of the first-level impeller outlet 202*a*, and the structure is simple and is convenient to manufacture.

In some embodiments, referring to FIG. 11, the second flow guide member 4 is spaced from the impeller 20 on the upstream side in the radial direction to define an annular micro gap therebetween. That is, in the radial direction of the impeller 20, the second flow guide member 4 is spaced from the first-level impeller 20*a* to define an annular micro gap therebetween. Thus, the second flow guide member 4 may be prevented from interfering with motion of the first-level impeller 20*a*, and meanwhile, assembly is facilitated.

According to some embodiments of the present disclosure, the first flow guide member 3 has a mounting surface 318. The mounting surface 318 is a surface of the first flow guide member 3 close to the impeller 20 on the upstream side. The second flow guide member 4 is mounted on the mounting surface 318. For example, as illustrated in FIG. 1, a diameter of the mounting surface 318 is greater than a diameter of the first-level impeller 20*a*, in such a manner that a part of the mounting surface 318 beyond the impeller 20 in the radial direction is formed as mounting space. The second flow guide member 4 may be mounted in the mounting space of the mounting surface 318. In this way, the second flow guide member 4 is mounted more stably, and it is also beneficial to improve a space utilization rate of the fan assembly 100, and meanwhile, facilitates the second flow guide member 4 to guide the flow of output air of the first-level impeller outlet 202*a*.

Further, the second flow guide member 4 includes a second flow guide member body 41 and a mounting portion 42. The mounting portion 42 of the second flow guide member is disposed on the second flow guide member body 41. A mounting portion 319 of the first flow guide member is formed on the mounting surface 318. The mounting portion 42 of the second flow guide member is detachably connected to the mounting portion 319 of the first flow guide member. In this way, mounting and dismounting of the second flow guide member 4 and the first flow guide member 3 may be facilitated. For example, the mounting portion 319 of the first flow guide member and the mounting portion 42 of the second flow guide member may be connected by insertion or snapping. A specific connection manner of the mounting portion 319 of the first flow guide member and the mounting portion 42 of the second flow guide member is not limited herein. The connection manner of the mounting portion 319 of the first flow guide member and the mounting portion 42 of the second flow guide member may be reasonably selected according to actual requirements.

Further, referring to FIG. 11, the mounting portion 319 of the first flow guide member is formed as a first mounting groove. The mounting portion 42 of the second flow guide member is formed as a second mounting protrusion. For example, the mounting portion 42 of the second flow guide member may be formed by radial bulging of at least part of a side surface of the second flow guide member body 41 facing towards the first flow guide member 3. The second mounting protrusion may be inserted into the first mounting groove. In this way, connection between the first flow guide member 3 and the second flow guide member 4 is more stable and it is convenient to disassemble. The present disclosure is not limited thereto. Alternatively, the mounting portion 319 of the first flow guide member is formed as a first mounting protrusion, and the mounting portion 42 of the second flow guide member is formed as a second mounting groove.

According to some embodiments of the present disclosure, the second flow guide member 4 includes a second flow guide member body 41. The second flow guide member body 41 has a flow guide surface 411 and a pressing-abutting surface 412. The pressing-abutting surface 412 of the second flow guide member body matches and presses and abuts against the mounting surface 318. The flow guide surface 411 of the second flow guide member body is configured to guide the output air of the first-level impeller outlet 202*a* to the flow guide channel 301. For example, as illustrated in FIG. 11, the pressing-abutting surface 412 of the second flow guide member body and the mounting surface 318 face each other in the axial direction of the first-level impeller 20*a*. Meanwhile, the pressing-abutting surface 412 of the second flow guide member body and the mounting portion 42 of the second flow guide member are arranged inside and outside in the radial direction. The pressing-abutting surface 412 of the second flow guide member body is located on a radial inner side of the mounting portion 42 of the second flow guide member. The pressing-abutting surface 412 of the second flow guide member body and the mounting portion 42 of the second flow guide member are formed as a step structure. The flow guide surface 411 of the second flow guide member body faces towards the housing 1. The flow guide surface 411 of the second flow guide member body is formed as a cambered surface. In this way, the pressing-abutting surface 412 of the second flow guide member body facilitates stable engagement between the second flow guide member 4 and the first flow guide member 3. The flow guide surface 411 of the second flow guide member body may reduce the wind resistance and the air volume loss while achieving the flow guiding effect.

Further, the impeller outlet 202 of the impeller 20 on the upstream side has a lower edge. An inner circumferential edge of the flow guide surface 411 of the second flow guide member body extends to a position adjoining the lower edge of the impeller outlet 202. An outer circumferential edge of the flow guide surface 411 of the second flow guide member body extends to a junction between the mounting surface 318 of the first flow guide member 3 and an outer peripheral surface of the first flow guide member 3. In other words, an inner circumferential edge of the flow guide surface 411 of the second flow guide member body extends to a position adjoining an edge of the impeller disk 23 of the first-level impeller 20*a*. The outer circumferential edge of the flow guide surface 411 of the second flow guide member body extends to a junction of the outer peripheral surface of the first flow guide member 3. In this way, the flow guide surface 411 of the second flow guide member body may better guide the output air of the first-level impeller outlet 202*a* to the flow guide channel 301 to reduce the air volume loss.

Further, the flow guide surface 411 of the second flow guide member body smoothly transitions to the outer peripheral surface of the first flow guide member 3. For example, the flow guide surface 411 of the second flow guide member body may be tangent to an outer peripheral surface of the second flow guide member 4, to further reduce wind resistance at a joint between the flow guide surface 411 of the second flow guide member body and the outer peripheral surface of the second flow guide member 4, to reduce the air volume loss and improve an output air efficiency.

According to some embodiments of the present disclosure, referring to FIG. 11, an upstream flow guide surface corresponding to the impeller 20 on the upstream side is formed on an inner peripheral surface of the housing 1. The upstream flow guide surface corresponds to the flow guide surface 411 of the second flow guide member body. An upstream transition air channel 43 is formed between the upstream flow guide surface and the flow guide surface 411 of the second flow guide member body. The upstream transition air channel 43 communicates the impeller outlet 202 with a flow guide inlet of the flow guide channel 301. For example, as illustrated in FIG. 11, part of the inner wall of the housing 1 adjacent to the first-level impeller outlet 202*a* is formed as the upstream flow guide surface. The upstream flow guide surface is formed as a cambered surface. The upstream transition air channel 43 is defined between the upstream flow guide surface and the flow guide surface 411 of the second flow guide member body. The upstream transition air channel 43 has one end in communication with the first-level impeller outlet 202*a* and another end in communication with the flow guide inlet of the flow guide channel 301. Since the upstream flow guide surface and the flow guide surface 411 of the second flow guide member body are both formed in the arc shape, the upstream transition air channel 43 is also formed in the arc shape. Therefore, the upstream transition air channel 43 may reduce the wind resistance while realizing the flow guiding effect, reduce the air volume loss, and improve the output air efficiency.

Further, with reference to FIG. 11, a cross-sectional area of the upstream transition air channel 43 decreases from the impeller outlet 202 to the flow guide inlet of the flow guide channel 301. In other words, in a direction from the first-level impeller outlet 202*a* to the flow guide channel 301, the cross-sectional area of the upstream transition air channel 43 may gradually decrease. Therefore, it is beneficial to improve the air flow rate and form a negative pressure inside the fan assembly 100 to further improve the suction force of the vacuum cleaner.

In one specific example, as illustrated in FIG. 1 and FIG. 3, the first-level impeller 20*a*, the first flow guide member 3, and the second-level impeller 20*b* is coaxially arranged in the axial direction of the fan assembly 100. The output shaft 71 of the driving member 7 is fixedly connected to the first-level impeller 20*a* and the second-level impeller 20*b*, and is rotatably connected to the first flow guide member 3. Therefore, the space occupied by the impeller assembly 2 in the axial direction may be better reduced, which is beneficial to reduce the axial dimension of the fan assembly 100 and achieve the lightweight design of the vacuum cleaner. In addition, the output shaft 71 of the driving member 7 and the plurality of impellers 20 may be coaxially arranged, and the output shaft 71 of the driving member 7 is connected to each of the plurality of impellers 20 in a transmission manner, to reduce the number of driving members 7 and save space occupied by the driving member 7 to further reduce the size of the fan assembly 100 and facilitate the lightweight design of the vacuum cleaner and a low investment cost.

According to some embodiments of the present disclosure, referring to FIG. 2, the housing 1 includes a housing body 11 and a cover 12. The housing body 11 is adapted to match the cover 12 to define the accommodation cavity 13. The air inlet 14 is formed on the cover 12. The housing body 11 is detachably connected to the cover 12. Therefore, by disassembling the cover 12 from the housing body 11, the impeller assembly 2 and the like may be conveniently mounted in the accommodation cavity 13, to reduce assembly difficulty of the fan assembly 100.

Here, the cover 12 covers the first-level impeller 20*a*. The cover 12 defines an annular groove 18 surrounding the air inlet 14 and facing towards the first flow guide member 13. An outer circumferential edge of the impeller inlet 201 of the first-level impeller 20*a* is located in the annular groove 18. Therefore, by aligning the annular groove 18 with the impeller inlet 201 of the first-level impeller 20*a*, the cover 12 and the first-level impeller 20*a* can be quickly positioned, which is beneficial to improve the assembly efficiency of the fan assembly 100 and enables the airflow passing through the air inlet 14 to completely enter the first-level impeller 20*a* to better avoid the gas flow loss.

In one specific example, referring to FIG. 2 and FIG. 4, the cover 12 includes a cover body 121, a first bending portion 122, and a second bending portion 123. An upper end of the cover body 121 is bent towards the inside of the air outlet 15 to form the first bending portion 122. An end of the first bending portion 122 away from the cover body 121 is bent towards the first-level impeller 20*a* to form the second bending portion 123. The cover body 121, the first bending portion 122, and the second bending portion 123 together define the annular groove 18, i.e., the second bending portion 123 defines the air inlet 14, which enables the airflow to directly enter the impeller inlet 201 along the second bending portion 123.

According to some embodiments of the present disclosure, referring to FIG. 3 and FIG. 4, the sealing member 8 includes a first sealing member 81 and a second sealing member 82. The first sealing member 81 is configured to seal a gap between the annular groove 18 and the first-level impeller 20*a*. That is, at least part of the first sealing member 81 is located in the annular groove 18, and thus, the gap at the cover 12 and the impeller inlet 201 of the first-level impeller 20*a* is well filled through the first sealing member 81. As illustrated in FIG. 3, the second sealing member 82 is configured to seal a gap between an outer circumferential edge of the impeller inlet 201 of the second-level impeller 20*b* and the cavity wall of the accommodation cavity 13. That is, the second sealing member 82 is filled between an outer peripheral edge of the impeller outlet 202 of the second-level impeller 20*b* and the cavity wall of the accommodation cavity 13. Therefore, the airflow may be better prevented from flowing through the gap between the first-level impeller 20*a*, the second-level impeller 20*b*, and the cavity wall of the accommodation cavity 13, to reduce the airflow loss and improve the aerodynamic performance of the fan assembly 100. In addition, the resonance noise generated by the impeller 20 abutting against the housing 1 may be better avoided.

According to some embodiments of the present disclosure, referring to FIG. 15, the fan assembly 100 further includes a first bearing 10. An outer ring of the first bearing 10 is fixedly connected to the first flow guide member 3. The output shaft 71 of the driving member 7 penetrates through an inner ring of the first bearing 10. Therefore, while it is ensured that the output shaft 71 of the driving member 7 can rotate relative to the first flow guide member 3, the first bearing 10 is limited by the first flow guide member 3 and thus eccentric swing of the output shaft 71 of the driving member 7 is well suppressed, which is beneficial to improve the stability of the fan assembly 100.

Further, with reference to FIG. 15, the fan assembly 100 further includes a bearing seat 9. The bearing seat 9 is disposed between the first flow guide member 3 and the first bearing 10. Therefore, an acting force transmitted from the output shaft 71 of the driving member 7 to the first bearing 10 may be well buffered through the bearing seat 9, reducing interference of vibration of the driving member 7 and the like to the first flow guide member 3, and improving the stability of the fan assembly 100. The bearing seat 9 is detachably disposed on the first flow guide member 3, which reduces mounting difficulty of the bearing and facilitates later maintenance.

Further, with reference to FIG. 1 and FIG. 3, the bearing seat 9 has a bearing mounting groove 92 for accommodating the first bearing 10. The output shaft 71 of the driving member 7 penetrates through the first bearing 10. Therefore, mounting difficulty of the first bearing 10 may be better reduced. Further, in the airflow flowing direction of the fan assembly 100, a spacing between the bearing seat 9 and the impeller 20 on the upstream side is not smaller than a spacing between the first flow guide member 3 and the impeller 20 on the upstream side. That is, the spacing between the bearing seat 9 and the impeller 20 on the upstream side may be equal to the spacing between the first flow guide member 3 and the impeller 20 on the upstream side, as illustrated in FIG. 3, and an upper end surface of the first flow guide member body 302 and an upper end surface of the bearing seat 9 are located on a same horizontal plane; or the spacing between the bearing seat 9 and the impeller 20 on the upstream side is greater than the spacing between the first flow guide member 3 and the impeller 20 on the upstream side. It can be understood that the output shaft 71 of the driving member 7 is connected to the impeller 20 in a transmission manner, and is rotatably connected to the first flow guide member 3, which enables the impeller 20 to be rotatable relative to the first flow guide member 3. Therefore, the bearing seat 9 may be well prevented from interfering with rotation of the impeller 20, which is beneficial to improve the stability of the fan assembly 100. Moreover, the space in the axial direction of the fan assembly 100 may be better saved, and a reasonable layout is provided.

A limiting groove 312 for accommodating the bearing seat 9 is formed on an axial end surface of the first flow guide member 3 facing towards the impeller 20 on the upstream side. Therefore, mounting and positioning difficulty of the bearing seat 9 can be better reduced, which is beneficial to improve the assembly efficiency of the fan assembly 100 and better ensures a firm connection between the bearing seat 9 and the first flow guide member 3. Further, a through hole 310 of the first flow guide member is defined in a bottom wall of the limiting groove 312. The output shaft 71 of the driving member 7 penetrates through the through hole 310 of the first flow guide member. Therefore, it may be better achieved that the output shaft 71 of the driving member 7 is rotatably connected to the first flow guide member 3, and it is convenient for the output shaft 71 of the driving member 7 to pass through the first flow guide member 3 to be connected to the impeller 20 on the upstream side in a transmission manner.

Figure 16:
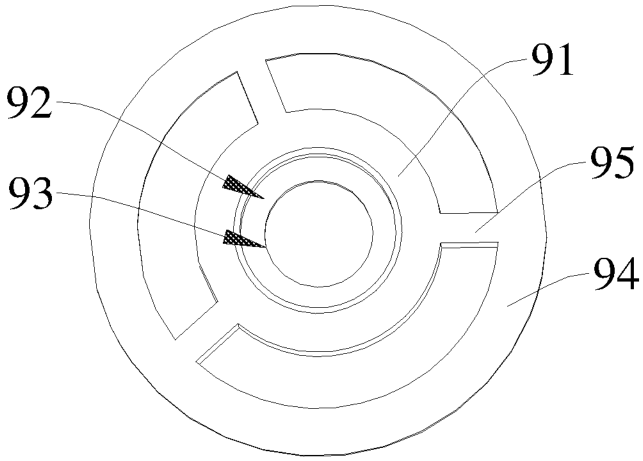
FIG. 16 is a schematic diagram of a bearing seat of a fan assembly according to an embodiment of the present disclosure, viewed from an angle.
Figure 17:
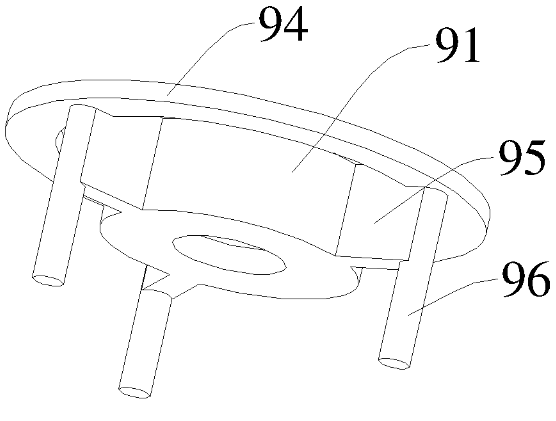
FIG. 17 is a schematic diagram of the bearing seat shown in FIG. 16, viewed from another angle.

According to some embodiments of the present disclosure, referring to FIG. 3 and FIG. 16, the bearing seat 9 includes a main body portion 91, an outer ring portion 94, and a connection portion 95. In some embodiments, the bearing mounting groove 92 is formed on the main body portion 92. A bottom wall of the bearing mounting groove 91 has a bearing seat through hole 93 directly facing the through hole 310 of the first flow guide member. That is, the first bearing 10 is disposed on the main body portion 91, and the output shaft 71 of the driving member 7 may pass through the bearing seat through hole 93 to cooperate with the bearing.

Further, the outer ring portion 94 is disposed on an outer peripheral side of the main body portion 91. The outer ring portion 94 is disposed coaxially with the main body portion 91. Two ends of the connection portion 95 are connected to opposite side walls of the main body portion 91 and the outer ring portion 94, respectively. That is, the outer ring portion 94 is located on a radial outer side of the main body portion 91. One end of the connection portion 95 is connected to a side of the outer ring portion 94 facing towards the main body portion 91, and another end of the connection portion 95 is connected to an outer peripheral wall of the main body portion 91. Therefore, the connection portion 95 connects the main body portion 91 and the outer ring portion 94. In this way, when a torque on the output shaft 71 of the driving member 7 is transmitted to the main body portion 91 through the bearing, the main body portion 91 disperses the torque to the outer ring portion 94 through the connection portion 95. Therefore, it is possible to better avoid concentration of stress at the main body portion 91 to better prevent the acting force from being further transmitted towards the first flow guide member 3, and improve the structural strength of the first flow guide member 3.

The main body portion 91, the outer ring portion 94, and the connection portion 95 are all embedded in the limiting groove 312. That is, the limiting groove 312 can well accommodate the main body portion 91, the outer ring portion 94, and the connection portion 95 to further improve the fixing strength of the first flow guide member 3 to the bearing seat 9.

In some embodiments, a plurality of connection portions 95 is provided. The plurality of connection portions 95 is arranged at intervals along the outer peripheral wall of the main body portion 91. Therefore, by connecting the plurality of connection portions 95 on the outer peripheral wall of the main body portion 91 to the outer ring portion 94, the torque acting on the main body portion 91 can be well dispersed through the plurality of connection portions 95, which ensures the firm connection between the main body portion 91 and the outer ring portion 94 and improves the structural strength of the bearing seat 9.

Figure 9:
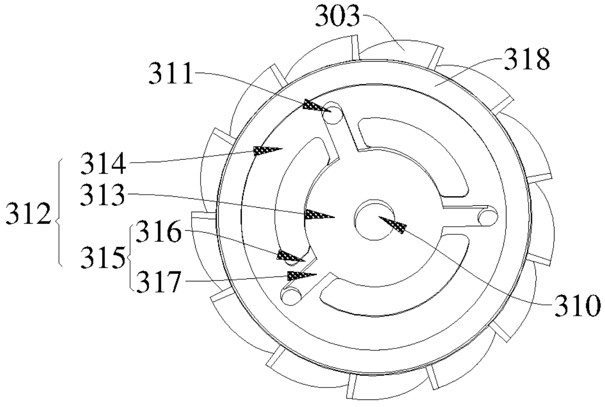
FIG. 9 is a schematic diagram of the first flow guide member shown in FIG. 7, viewed from yet another angle.
Figure 10:
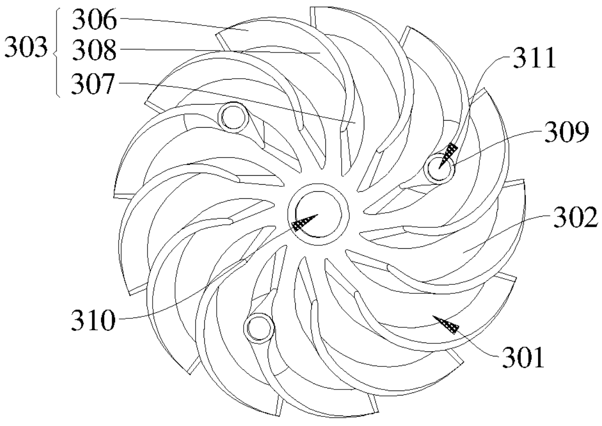
FIG. 10 is a schematic diagram of the first flow guide member shown in FIG. 7, viewed from still yet another angle.

According to some embodiments of the present disclosure, referring to FIG. 7 to FIG. 9, the limiting groove 312 includes a first limiting groove 313, a second limiting groove 314, and a third limiting groove 315. In some embodiments, the first limiting groove 313 extends in the axial direction of the fan assembly 100. The main body portion 91 is accommodated in the first limiting groove 313. A bottom wall of the first limiting groove 313 forms the through hole 310 of the first flow guide member. The second limiting groove 314 extends in the circumferential direction of the fan assembly 100 and is formed in an annular shape. The outer ring portion 94 is accommodated in the second limiting groove 314. The third limiting groove 315 extends in the radial direction of the fan assembly 100. Two ends of the third limiting groove 315 are in communication with the first limiting groove 313 and the second limiting groove 314, respectively. The connection portion 95 is located in the third limiting groove 315.

Therefore, by limiting the position of the connection portion 95 through the third limiting groove 315, the main body portion 91 may be better restricted from rotating relative to the first limiting groove 313, and the outer ring portion 94 may be better restricted from rotating relative to the second limiting groove 314, avoiding abrasion caused by relative movement between the bearing seat 9 and the first flow guide member 3. In addition, alignment difficulty between the bearing seat 9 and the limiting groove 312 may be better reduced, which is beneficial to improve the assembly efficiency of the fan assembly 100.

Further, the third limiting groove 315 includes a first limiting sub-groove 316 and a second limiting sub-groove 317 that are arranged in the axial direction of the fan assembly. At least part of the connection portion 95 is located in the second limiting sub-groove 317. In the circumferential direction of the fan assembly 100, a width of the first limiting sub-groove 316 is greater than a width of the second limiting sub-groove 317.

Therefore, through the second limiting sub-groove 317, a certain spacing can be formed between the connection portion 95 and opposite side walls of the second limiting sub-groove 317, which is convenient for grabbing the connection portion 95 through the gap and disassembling the bearing seat 9. Further, the material investment of the first flow guide member 3 is reduced, and a lighter weight is realized.

In one example of the present disclosure, the connection portion 95 includes a first connection sub-segment 951 and a second connection sub-segment 952 that are arranged in the axial direction of the fan assembly 100. In the circumferential direction of the fan assembly 100, a width of the first connection sub-segment 951 is greater than a width of the second connection sub-segment 952. The first limiting sub-groove 316 is adapted to accommodate the first connection sub-segment 951. The second limiting sub-groove 317 is adapted to accommodate the second connection sub-segment 952. Therefore, the connection strength between the outer ring portion 94 and the main body portion 91 can be better improved, i.e., the structural strength of the bearing seat 9 is improved. In addition, a contact area between the connection portion 95 and the outer ring portion 94 and the main body is increased to further restrict the rotation of the bearing seat 9 relative to the first flow guide member 3.

According to some embodiments of the present disclosure, a support post 96 is disposed on a side of the bearing seat 9 away from the impeller 20 on the upstream side. The support post 96 extends away from the impeller 20 on the upstream side in the axial direction of the fan assembly 100. The limiting groove 312 has a support post penetrating hole 311 in which the support post 96 is accommodated. The support post 96 is inserted into the support post penetrating hole 311. Therefore, through the position limiting effect of the first flow guide member 3 on the support post 96, the rotation of the bearing seat 9 relative to the first flow guide member 3 is restricted, to further avoid the abrasion caused by the relative movement between the bearing seat 9 and the first flow guide member 3.

In some embodiments, the support post 96 is disposed on a side of the outer ring portion 94 away from the impeller 20 on the upstream side and extends in a direction away from the impeller 20 on the upstream side. The support post penetrating hole 311 is defined in a bottom wall of the second limiting groove 314, and extends in the axial direction of the fan assembly 100. Therefore, the support post 96 may be inserted into the support post penetrating hole 311 in the axial direction of the fan assembly 100, which may better reduce the assembly difficulty of the bearing seat 9.

In some embodiments, a plurality of support posts 96 is provided. The plurality of support posts 96 is arranged at intervals in a circumferential direction of the main body portion 91. Accordingly, a plurality of support post penetrating holes 311 matching the support posts 96 is defined in the first flow guide member 3. The plurality of support posts 96 penetrates through the plurality of support post penetrating holes 311, to further restrict the rotation of the bearing seat 9 relative to the first flow guide member 3 through the position limiting effect of the flow guide ribs 303 on the plurality of support posts 96, and to further avoid the abrasion caused by the relative movement between the bearing seat 9 and the first flow guide member 3.

In a specific example, the support post penetrating hole 311 penetrates the outer limiting protrusion 309, and the support post 96 penetrates through the outer limiting protrusion 309. That is, the support post penetrating hole 311 is disposed in the outer limiting protrusion 309. It can be understood that the outer limiting protrusion 309 protrudes from the outer peripheral wall of the main body portion 91 and extends in the axial direction of the fan assembly 100. Therefore, the support post penetrating hole 311 may have a longer extending length, and then the support post 96 having a longer length may be provided to further improve the connection strength between the first flow guide member 3 and the bearing seat 9.

According to some embodiments of the present disclosure, the fan assembly further includes a third flow guide member (not shown) and a diffuser 6. At least part of the diffuser 6 is disposed in the air outlet 15. The diffuser 6 is disposed between the impeller 20 on the downstream side and the air outlet 15. An air outlet channel 63 is defined between the diffuser 6 and the housing 1, and is in communication with the air outlet 15 of the housing 1. The third flow guide member is disposed between the impeller 20 on the downstream side and the diffuser 6 to guide the output air of the impeller outlet 202 on the downstream side to the air outlet channel 63. In this way, by providing the third flow guide member, it is beneficial to reduce wind resistance between the second-level impeller outlet **202*b* and the air outlet channel 63, and reduce the wind power loss to further improve the air flowing efficiency of the fan assembly 100**.

Further, the third flow guide member is configured in an annular shape, and sleeved on an outer side of the impeller 20 on the downstream side. That is, the third flow guide member is sleeved on the outer side of the second-level impeller **20*b*. For example, as illustrated in FIG. 1, the third flow guide member is formed as a third flow guide ring. The third flow guide ring is sleeved on an outer peripheral side of the second-level impeller outlet 202*b* to guide the output air of the second-level impeller outlet 202*b* to the flow guide channel 301. In this way, the third flow guide member can guide the flow of output air at any circumferential position of the second-level impeller outlet 202*b***. Meanwhile, the structure is simple and is convenient to manufacture.

In some embodiments, the third flow guide member is spaced from the impeller 20 on the downstream side in the radial direction to define an annular micro gap therebetween. That is, in the radial direction of the impeller 20, the third flow guide member is spaced from the second-level impeller **20*b* to define the annular micro gap therebetween. Thus, the third flow guide member can be prevented from interfering with motion of the second-level impeller 20*b***, and meanwhile, the assembly is facilitated.

According to some embodiments of the present disclosure, the diffuser 6 has a diffuser mounting surface. The diffuser mounting surface is a surface of the diffuser 6 close to the impeller 20 on the downstream side. The third flow guide member is mounted on the diffuser mounting surface. A diameter of the diffuser mounting surface is greater than a diameter of the second-level impeller **20*b*, and a part of the diffuser mounting surface beyond the impeller 20 in the radial direction is formed as mounting space. The third flow guide member may be mounted in the mounting space of the diffuser mounting surface. In this way, the third flow guide member can be mounted more stably, which is beneficial to improve the space utilization rate of the fan assembly 100, and meanwhile, also facilitates the third flow guide member to guide the flow of output air of the second-level impeller outlet 202*b***.

Further, the third flow guide member includes a third flow guide member body and a mounting portion. The mounting portion of the third flow guide member is disposed on the third flow guide member body. A diffuser mounting portion is formed on the diffuser mounting surface. The mounting portion of the third flow guide member is detachably connected to the diffuser mounting portion. In this way, mounting and dismounting of the third flow guide member and the diffuser 6 may be facilitated. For example, the mounting portion of the third flow guide member and the diffuser mounting portion may be connected by insertion or snapping. A specific connection manner of the mounting portion of the third flow guide member and the diffuser mounting portion is not limited herein. The specific connection manner of the mounting portion of the third flow guide member and the diffuser mounting portion may be reasonably selected according to the actual requirements.

Further, the diffuser mounting portion is formed as a diffuser mounting groove. The mounting portion of the third flow guide member is formed as a third mounting protrusion. For example, the mounting portion of the third flow guide member may be formed by radial bulging of at least part of a side surface of the third flow guide member body facing towards the diffuser 6. The third mounting protrusion may be inserted into the diffuser mounting groove. In this way, the connection between the third flow guide member and the diffuser 6 is more stable and is convenient to disassemble. The present disclosure is not limited thereto. Alternatively, the diffuser mounting portion is formed as a third mounting protrusion, and the mounting portion of the third flow guide member is formed as a third mounting groove.

According to some embodiments of the present disclosure, the third flow guide member includes a third flow guide member body. The third flow guide member body has a flow guide surface and a pressing-abutting surface. The pressing-abutting surface of the third flow guide member body matches and presses and abuts against the diffuser mounting surface. The flow guide surface of the third flow guide member body is configured to guide the output air of the second-level impeller outlet 202*b* to the air outlet channel 63. For example, as illustrated in FIG. 1, the pressing-abutting surface of the third flow guide member body and the diffuser mounting surface face each other in the axial direction of the second-level impeller 20*b*. Meanwhile, the pressing-abutting surface of the third flow guide member body and the mounting portion of the third flow guide member are arranged inside and outside in the radial direction. The pressing-abutting surface of the third flow guide member body is located on a radial inner side of the mounting portion of the third flow guide member. The pressing-abutting surface of the third flow guide member body and the mounting portion of the third flow guide member are formed as a step structure. The flow guide surface of the third flow guide member body faces towards the housing 1. The flow guide surface of the third flow guide member body is formed as a cambered surface. In this way, the pressing-abutting surface of the third flow guide member body facilitates stable engagement between the third flow guide member and the diffuser 6. The flow guide surface of the third flow guide member body can reduce the wind resistance and the air volume loss while achieving the flow guiding effect.

Further, the impeller outlet 202 of the impeller 20 on the upstream side has a lower edge. An inner circumferential edge of the flow guide surface of the third flow guide member body extends to a position adjoining the lower edge of the impeller outlet 202. An outer circumferential edge of the flow guide surface of the third flow guide member body extends to a junction between the mounting surface 318 of the diffuser 6 and an outer peripheral surface of the diffuser 6. In other words, an inner circumferential edge of the flow guide surface of the third flow guide member body extends to a position adjoining an edge of the impeller disk 23 of the second-level impeller 20*b*. The outer circumferential edge of the flow guide surface of the third flow guide member body extends to a junction of the outer peripheral surface of the diffuser 6. In this way, the flow guide surface of the third flow guide member body can better guide the output air of the second-level impeller outlet 202*b* to the air outlet channel 63 to reduce the air volume loss.

Further, referring to FIG. 1 and FIG. 14, the flow guide surface of the third flow guide member body smoothly transitions to the outer peripheral surface of the diffuser 6. For example, the flow guide surface of the third flow guide member body may be tangent to the outer peripheral surface of the diffuser 6, to further reduce wind resistance at a joint between the flow guide surface of the third flow guide member body and the diffuser 6, reduce the air volume loss, and improve the air output efficiency.

Further, a downstream flow guide surface corresponding to the impeller 20 on the downstream side is formed on the inner peripheral surface of the housing 1. The downstream flow guide surface corresponds to the flow guide surface of the third flow guide member body. A downstream transition air channel 5 is formed between the downstream flow guide surface and the flow guide surface of the third flow guide member body. The downstream transition air channel 5 communicates the impeller outlet 202 with an inlet of the air outlet channel 63. For example, part of the inner wall of the housing 1 adjacent to the second-level impeller outlet 202*b* is formed as the downstream flow guide surface. The downstream flow guide surface is formed as a cambered surface. The downstream transition air channel 5 is defined between the downstream flow guide surface and the flow guide surface of the third flow guide member body. The downstream transition air channel 5 has one end in communication with the second-level impeller outlet 202*b* and another end in communication with the inlet of the air outlet channel 63. Since the downstream flow guide surface and the flow guide surface of the third flow guide member body are both formed in the arc shape, the downstream transition air channel 5 is also formed in the arc shape. Therefore, the downstream transition air channel 5 can reduce the wind resistance while realizing the flow guiding effect, which reduces the air volume loss, and improves the air output efficiency.

Further, a cross-sectional area of the downstream transition air channel 5 decreases from the impeller outlet 202 to the inlet of the air outlet channel 63. In other words, in a direction from the second-level impeller outlet 202*b* to the air outlet channel 63, the cross-sectional area of the downstream transition air channel 5 may gradually decrease. Therefore, it is beneficial to improve the air flow rate and form a negative pressure inside the fan assembly 100 to further improve the suction force of the vacuum cleaner.

According to some embodiments of the present disclosure, the plurality of impellers 20 is located on a same side of the driving member 7 in the axial direction of the fan assembly 100. Therefore, the output air of the impeller 20 on the upstream side can be directly guided and discharged to the impeller 20 on the downstream side through the first flow guide member 3, which may better reduce the flow loss of the gas and facilitate the improvement of the aerodynamic performance of the fan assembly 100.

Further, referring to FIG. 14, the driving member 7 is adapted to define the air outlet 15 between the driving member 7 and an inner wall of the accommodation cavity 13, i.e., at least part of the driving member 7 is located in the accommodation cavity 13. For example, the driving member 7 may be completely located in the accommodation cavity 13 to be better protected by the housing 1; or as illustrated in FIG. 14, a part of the driving member 7 is located in the accommodation cavity 13. The air outlet 15 surrounding the driving member 7 is defined between an outer peripheral wall of the driving member 7 and the cavity wall of the accommodation cavity 13. Therefore, even output air at the air outlet 15 may be better ensured, and the fan assembly 100 has a compact mechanism, which facilitates the reduction of the radial dimension of the fan assembly 100.

According to some other embodiments, at least two impellers 20 are distributed on two sides of the driving member 7 in the axial direction of the fan assembly 100. That is, the first-level impeller 20*a* and the second-level impeller 20 *b* are located on two axial sides of the driving member 7, respectively. In some embodiments, as illustrated in FIG. 14, the impeller 20 on the upstream side and the impeller 20 on the downstream side are located on the two axial sides of the driving member 7, respectively, which enables the air outlet 15 of the impeller 20 on the upstream side to be discharged to the impeller 20 on the downstream side after flowing through the driving member 7. Therefore, a spacing between the driving member 7 and the impeller 20 can be better reduced, reducing transmission loss of the rotation of the driving member 7 and facilitating the reduction of power consumption of the driving member 7.

For example, in the axial direction of the fan assembly 100, the spacing between the driving member 7 and the impeller 20 on the upstream side is controlled to be consistent with a spacing between the driving member 7 and the downstream side, which is beneficial to improve the stability of the driving member 7 in driving the impeller 20 to rotate.

Here, radial output air of the impeller 20 on the upstream side can be adjusted towards the axial direction of the fan assembly 100 by means of the first flow guide member 3, and the driving member 7 is spaced from the inner surface of the housing 1 in the axial direction, which enables the airflow to flow towards the impeller 20 on the downstream side through a gap between the driving member 7 and the housing 1.

In some embodiments, referring to FIG. 14, the fan assembly 100 further includes a contraction portion 17. The impeller 20 on the downstream side is disposed on a downstream side of the contraction portion 17. An inner diameter of the contraction portion 17 decreases in a direction from the driving member 7 towards the impeller 20 on the downstream side. A minimum inner diameter e of the contraction portion 17 and an inner diameter d of the impeller inlet 201 on the downstream side satisfy: e=d. That is, an inner diameter of an end of the contraction portion 17 adjacent to the impeller 20 on the downstream side is the same as an inner diameter of the impeller inlet 201 of the impeller 20 on the downstream side. Therefore, output air on the downstream side of the driving member 7 can be better converged through the contraction portion 17, which enables the output air passing through the contraction portion 17 to stably flow into the impeller inlet 201 on the downstream side, and enables the contraction portion 17 to be better aligned with the impeller inlet 201 on the downstream side to facilitate the improvement of the air flowing stability.

Example 1

A fan assembly 100 includes: a housing1, an impeller assembly 2, a first flow guide member 3, a bearing seat 9, a first bearing 10, a driving member 7, and a sealing member 8. The impeller assembly 2 includes a first-level impeller 20*a* and a second-level impeller 20*b* that are coaxially arranged with the first flow guide member 3 and an output shaft 71 of the driving member 7. The first-level impeller 20*a* and the second-level impeller 20*b* are located on a same axial side of the driving member 7. The first flow guide member 3 is located between the first-level impeller 20*a* and the second-level impeller 20*b*. The output shaft 71 of the driving member 7 is connected to the first-level impeller 20*a* and the second-level impeller 20*b* in a transmission manner, and is rotatably connected to the first flow guide member 3.

The housing 1 includes a housing body 11 and a cover 12. The housing body 11 and the cover 12 together define an accommodation cavity 13. The cover 12 is detachably connected to the housing body 11. An air inlet 14 in communication with the accommodation cavity 13 is formed on a side of the cover 12 away from the housing body 11. The cover 12 covers the first-level impeller 20*a*. An air outlet 15 is defined between the driving member 7 and an inner surface of the housing body 11.

The first-level impeller 20*a* and the second-level impeller 20*b* each include: an impeller cover 22, an impeller disk 23, and vanes 21. In some embodiments, an impeller inlet 201 is formed on the impeller cover. The impeller inlet 201 is opened in an axial direction of the impeller 20. The impeller disk 23 faces and is spaced from the impeller cover 22 in the axial direction of the impeller 20. An impeller air channel 203 is defined between the impeller disk 23 and the impeller cover 22. A radial inner end of the impeller air channel 203 is in communication with the impeller inlet 201. An impeller outlet 202 is formed in a radial outer end of the impeller air channel 203. A plurality of vanes 21 is arranged at intervals in the air channel in a circumferential direction of the impeller inlet 201. Each of the plurality of vanes 21 may form an arc that is bent radially with respect to the impeller 20. Any two adjacent vanes 21 in the circumferential direction and the impeller cover 22 and the impeller disk 23 define an impeller sub-outlet 205.

The cover 12 includes a cover body 121, a first bending portion 122, and a second bending portion 123. An outer circumferential edge of the air outlet 15 is bent towards the inside of the air outlet 15 to form the first bending portion 122. An end of the first bending portion 122 away from the cover body 121 is bent towards the first-level impeller 20*a* to form the second bending portion 123. An annular groove 18 is defined between the first bending portion 122, the second bending portion 123, and the cover body 121. An outer circumferential edge of the impeller outlet 202 of the first-level impeller 20*a* is located in the annular groove 18.

A limiting groove 312 is formed on an end surface of the first flow guide member 3 facing towards the first-level impeller 20*a*. The bearing seat 9 is mounted in the limiting groove 312. The bearing seat 9 includes a main body portion 91, an outer ring portion 94, a connection portion 95, and a support post 96. The main body portion 91 defines a bearing mounting groove 92 extending in an axial direction of the housing 1. A through hole penetrating the main body portion 91 is defined in a bottom wall of the bearing mounting groove 92. The first bearing 10 is mounted in the bearing mounting groove 92. The outer ring portion 94 is located on an outer peripheral side of the main body portion 91. Opposite side walls of the outer ring portion 94 and the main body portion 91 are connected to each other through the connection portion 95. A plurality of connection portions 95 is provided. The plurality of connection portions 95 is arranged at intervals along the outer peripheral wall of the main body portion 91. The support post 96 is disposed on a lower end surface of the outer ring portion 94 and extends in a direction away from the first-level impeller 20*a*.

Further, the connection portion 95 includes a first connection sub-segment 951 and a second connection sub-segment 952 that are stacked on each other. The first connection sub-segment 951 is located on an upper side of the second connection sub-segment 952. In a circumferential direction of the main body portion 91, a width of the first connection sub-segment 951 is greater than a width of the second connection sub-segment 952. The limiting groove 312 includes a first limiting groove 313, a second limiting groove 314, a third limiting groove 315, and a support post penetrating hole 311. In some embodiments, the first limiting groove 313 extends in the axial direction of the housing 1. A through hole 310 for the first flow guide member is defined in a bottom wall of the first limiting groove 313. The main body portion 91 is located in the first limiting groove 313. The second limiting groove 314 is formed in an annular shape and located on an outer peripheral side of the second limiting groove 314. The outer ring portion 94 is located in the second limiting groove 314. Two ends of the third limiting groove 315 are in communication with the first limiting groove 313 and the second limiting groove 314, respectively. The connection portion 95 is located in the third limiting groove 315. The third limiting groove 315 includes a first limiting sub-groove 316 and a second limiting sub-groove 317. The second limiting sub-groove 317 is formed by the bottom wall of the first limiting sub-groove 316 extending in a direction away from the first-level impeller 20*a*. In a circumferential direction of the first limiting groove 313, a width of the first limiting sub-groove 316 is greater than a width of the second limiting sub-groove 317. The second connection sub-segment 952 is located in the second limiting sub-groove 317. The first connection sub-segment 951 is located in the first limiting sub-groove 316. In addition, the support post penetrating hole 311 is disposed in a bottom wall of the second limiting groove 314 and extends in the direction away from the first-level impeller 20*a*. The support post 96 passes through the support post penetrating hole 311.

The first flow guide member 3 includes a first flow guide member body 302, a flow guide rib 303, and an outer limiting protrusion 309. An end of the flow guide rib 303 away from the first flow guide member body 302 abuts against the inner wall of the accommodation cavity 13. A cross-sectional area of the first flow guide member body 302 decreases in the direction away from the first-level impeller 20*a*. A plurality of flow guide ribs 303 is provided. The plurality of flow guide ribs 303 is arranged at intervals on the outer peripheral wall of the first flow guide member body 302 in a circumferential direction. An included angle between a deflection angle of the flow guide ribs 303 and an axial direction of the fan assembly 100 gradually decreases in a direction facing towards the second-level impeller 20*b*.

Here, the flow guide rib 303 includes a first extending segment 306, a second extending segment 307, and a connection segment 308. The connection segment 308 is located between the first extending segment 306 and the second extending segment 307. Two ends of the connection segment 308 are connected to one end of the first extending segment 306 and one end of the second extending segment 307, respectively. Another end of the first extending segment 306 extends towards the first-level impeller 20*a*. Another end of the second extending segment 307 extends towards the second-level impeller 20*b*. A thickness of the first extending segment 306 gradually decreases in a direction away from the connection segment 308, and a thickness of the second extending segment 307 gradually decrease in a direction away from the connection segment 308, i.e., a thickness of an upper end and a thickness of a lower end of the flow guide rib 303 are smaller than a thickness of a middle position of the flow guide rib 303.

The outer limiting protrusion 309 extends in the axial direction of the fan assembly 100. At least part of the outer limiting protrusion 309 is disposed on the flow guide rib 303. Part of the support post penetrating hole 311 is disposed in the outer limiting protrusion 309. A rotation-limiting groove 16 matching the outer limiting protrusion 309 is formed on an inner wall of the housing body 11. The outer limiting protrusion 309 passes through the rotation-limiting groove 16.

The second-level impeller 20*b* is disposed on a side of the first flow guide member 3 away from the first-level impeller 20*a*. The inner wall of the accommodation cavity 13 smoothly transitions to an inner peripheral wall of the impeller inlet 201 of the second-level impeller 20*b*. The sealing member 8 includes a first sealing member 81 and a second sealing member 82. The first sealing member 81 is filled in the annular groove 18. The second sealing member 82 is filled between the outer circumferential edge of the impeller inlet 201 of the second-level impeller 20*b* and the inner wall of the accommodation cavity 13.

The driving member 7 is located on the side of the second-level impeller 20*b* away from the first flow guide member 3. The output shaft 71 of the driving member 7 successively passes through the second-level impeller 20*b*, the first flow guide member 3, the bearing seat 9, and the first bearing 10 to cooperate with the first-level impeller 20*a*. The output shaft 71 of the driving member 7 is fixedly connected to the first-level impeller 20*a* and the second impeller 20. The output shaft 71 of the driving member 7 is rotatable in the through hole 310 of the first flow guide member and the bearing seat through hole 93.

Example 2

A structure according to this example is substantially the same as that according to Example 1, where the same components are denoted by same reference signs. Referring to FIG. 3 and FIG. 14, Example 1 differs from Example 2 in the following configurations. In the axial direction of the fan assembly 100, the first-level impeller 20*a* and the second-level impeller 20*b* are located on two sides of the driving member. An air outlet 15 is formed at an end of the housing body 11 away from the cover 12. The second-level impeller 20*b* is disposed in the air outlet 15. An end of the housing body 11 away from the cover 12 is connected to a plurality of diffusers 6 connected in series, which enables the airflow discharged from the second-level impeller 20*b* to be discharged out of the fan assembly 100 after flowing through the plurality of diffusers 6.

The vacuum cleaner according to embodiments in a second aspect of the present disclosure is described below.

According to an embodiment of the present disclosure, the vacuum cleaner includes the fan assembly 100 described above. Since the fan assembly 100 has a small axial dimension and a high internal vacuum degree, and may occupy less mounting space of the vacuum cleaner, which facilitates size reduction of the vacuum cleaner, achieves the lightweight design of the vacuum cleaner with a high suction force, and facilitates the improvement of the dust absorption efficiency of the vacuum cleaner.

In the vacuum cleaner according to the embodiments of the present disclosure, by providing the fan assembly 100 used for the vacuum cleaner according to the above embodiments, the wind power can be improved to improve the suction force, and meanwhile, miniaturization and portability are facilitated.

In the present disclosure, unless otherwise clearly specified and limited, terms such as "mounted", "connected", "coupled", "fixed", and the like should be understood in a broad sense. For example, it may be a fixed connection or a detachable connection or connection as one piece; it may be a direct connection or an indirect connection through an intermediate; it may be an internal communication of two components or an interaction relationship between two components. For those of ordinary skill in the art, the specific meaning of the above-mentioned terms in the present disclosure can be understood according to specific circumstances.

In the description of this specification, descriptions with reference to the terms "an embodiment", "some embodiments", "an example", "specific examples", or "some examples" etc. mean that specific features, structure, materials or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art can combine the different embodiments or examples and the features of the different embodiments or examples described in this specification without contradicting each other.

Although embodiments of the present disclosure have been illustrated and described, it is conceivable for those of ordinary skill in the art that various changes, modifications, replacements, and variations can be made to these embodiments without departing from the principles and ideas of the present disclosure. The scope of the present disclosure shall be defined by the claims and their equivalents.

What is claimed is:

1. A fan assembly comprising:

a housing comprising an accommodation cavity with a cross-sectional area that decreases in an airflow flowing direction of the fan assembly;

an impeller assembly at least partially disposed in the housing and comprising a first-level impeller and a second-level impeller connected in series in the airflow flowing direction;

a flow guide member at least partially disposed within the accommodation cavity of the housing, the flow guide member and the accommodation cavity of the housing being configured to guide and discharge output air of the first-level impeller to the second-level impeller, the flow guide member having a cross-sectional area that decreases in the airflow flowing direction; and a driving member configured to cause the first-level impeller and the second-level impeller to rotate, wherein:

the accommodation cavity of the housing forms one or more grooves formed axially through the accommodation cavity; and the flow guide member includes one or more post protrusions configured to interface with respective grooves of the one or more grooves of the accommodation cavity.

2. The fan assembly according to claim 1, wherein:

the flow guide member and the accommodation cavity of the housing define a flow guide channel; and the flow guide channel is configured to guide and discharge the output air of the first-level impeller to the second-level impeller.

3. The fan assembly according to claim 2, wherein each of the first-level impeller and the second-level impeller has an impeller inlet disposed along a rotation axis of the fan assembly and an impeller outlet disposed radially outward from the rotation axis of the fan assembly, wherein:

the flow guide member is adapted to guide the output air of an impeller outlet on the first-level impeller to flow to an impeller inlet on the second-level impeller at least along the rotation axis of the fan assembly; and a sectional area of the impeller outlet of the first-level impeller is greater than a sectional area of the impeller outlet of the second-level impeller.

4. The fan assembly according to claim 3, wherein each of the first-level impeller and the second-level impeller comprises:

an impeller cover having the impeller inlet;

an impeller disk,; and a plurality of vanes disposed between the impeller cover and the impeller disk, wherein a number of vanes of the plurality of vanes is N, where $7 \leqslant N \leqslant 13$.

5. The fan assembly according to claim 4, wherein the number of vanes of the first-level impeller is N1, the number of vanes of the second-level impeller is N2, and a number of flow guide ribs of the flow guide member is N3, where $8 \leqslant N1 \leqslant 12, 7 \leqslant N2 \leqslant 11$, and $N3>N1>N2$.

6. The fan assembly according to claim 5, wherein the number of flow guide ribs of the flow guide member and the number of vanes of each of the first-level impeller and the second-level impeller are mutual prime numbers, and a ratio of a diameter of an inner wall of the housing at a position radially facing an impeller disk of each impeller to an outer diameter of the corresponding impeller disk is in a range of 1.25 to 1.43.

7. The fan assembly according to claim 3, wherein at least one of the impeller inlet of the first-level impeller or the impeller outlet of the second-level impeller has a diameter between 18 millimeters and 21 millimeters.

8. The fan assembly according to claim 3, wherein the impeller inlet of the first-level impeller and the impeller outlet of the second-level impeller have a same diameter.

9. The fan assembly according to claim 3, wherein a width of the impeller outlet of the first-level impeller is B11, and a width of the impeller outlet of the second-level impeller is B21, where $B21=a1*B11$, and $0.6 \leqslant a1 \leqslant 0.9$.

10. The fan assembly according to claim 9, wherein a spacing between the first-level impeller and the second-level impeller in the axial direction of the fan assembly is L1, where $0.14 \leqslant B11/L1 \leqslant 0.17$, and $0.14 \leqslant B21/L1 \leqslant 0.17$.

11. The fan assembly according to claim 1, wherein:

an outer diameter of the first-level impeller is D11, where $37\ mm \leqslant D11 \leqslant 43\ mm$; and/or an outer diameter of the second-level impeller is D21, where $37\ mm \leqslant D21 \leqslant 43\ mm$.

12. The fan assembly according to claim 1, wherein an outer diameter of the first-level impeller is equal to an outer diameter of the second-level impeller.

13. The fan assembly according to claim 1, wherein an outer diameter of the first-level impeller is D11, an outer diameter of the second-level impeller is D21, a spacing between the first-level impeller and the second-level impeller in an axial direction of the fan assembly is L1, and a spacing between the flow guide member and the second-level impeller in the axial direction of the fan assembly is L2, where 1.27≤D11/L1≤1.87, 1.27≤D21/L1≤1.87, and 0.13≤L2/L1≤0.26.

14. The fan assembly according to claim 1, wherein the first-level impeller and the second-level impeller are located on a same side of the driving member in an axial direction of the fan assembly.

15. The fan assembly according to claim 1, wherein the first-level impeller and the second-level impeller are distributed on opposite sides of the driving member in an axial direction of the fan assembly.

16. The fan assembly according to claim 15, wherein:
the housing has a contraction portion;
the second-level impeller is disposed on a downstream side of the contraction portion;
an inner diameter of the contraction portion decreases in a direction along the driving member towards the second-level impeller; and
a minimum inner diameter e of the contraction portion and an inner diameter d of an impeller inlet of the second-level impeller satisfy: e=d.

17. A vacuum cleaner comprising the fan assembly according to claim 1.

18. The fan assembly according to claim 1, wherein a width of the flow guide member in an axial direction of the flow guide member is greater than widths of the first-level impeller and the second-level impeller in axial directions of the first-level impeller and the second-level impeller.

19. The fan assembly according to claim 1, wherein:
the flow guide member comprises a plurality of flow guide ribs; and
deflection angles of the flow guide ribs decrease between extents of the flow guide ribs proximate the first-level impeller and extents of the flow guide ribs proximate the second-level impeller.

20. A fan assembly comprising:
a housing comprising an accommodation cavity with a cross-sectional area that decreases in an airflow flowing direction of the fan assembly;
an impeller assembly at least partially disposed in the housing and comprising a first-level impeller and a second-level impeller connected in series in the airflow flowing direction;
a flow guide member at least partially disposed within the accommodation cavity of the housing, the flow guide member and the accommodation cavity of the housing being configured to guide and discharge output air of the first-level impeller to the second-level impeller, the flow guide member having a cross-sectional area that decreases in the airflow flowing direction; and
a driving member configured to cause the first-level impeller and the second-level impeller to rotate,
wherein an outer diameter of the first-level impeller is D11, an outer diameter of the second-level impeller is D21, a spacing between the first-level impeller and the second-level impeller in an axial direction of the fan assembly is L1, and a spacing between the flow guide member and the second-level impeller in the axial direction of the fan assembly is L2, where 1.27≤D11/L1≤1.87, 1.27≤D21/L1≤1.87,and 0.13≤L2/L1≤0.26.

* * * * *